US008422787B2

(12) United States Patent
Terao et al.

(10) Patent No.: US 8,422,787 B2
(45) Date of Patent: Apr. 16, 2013

(54) APPARATUS, METHOD AND PROGRAM FOR TEXT SEGMENTATION

(75) Inventors: Makoto Terao, Tokyo (JP); Takafumi Koshinaka, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 12/810,166

(22) PCT Filed: Dec. 25, 2008

(86) PCT No.: PCT/JP2008/073502
§ 371 (c)(1),
(2), (4) Date: Jun. 23, 2010

(87) PCT Pub. No.: WO2009/084554
PCT Pub. Date: Jul. 9, 2009

(65) Prior Publication Data
US 2010/0278428 A1 Nov. 4, 2010

(30) Foreign Application Priority Data

Dec. 27, 2007  (JP) .................................. 2007-336400

(51) Int. Cl.
*G06K 9/34* (2006.01)
(52) U.S. Cl.
USPC ........................................................ 382/177
(58) Field of Classification Search .................. 382/164,
382/171, 173, 176–180, 190, 229–231; 704/9,
704/57; 715/200, 209, 234, 256, 968; 358/2.1,
358/453, 462–464; 345/901; 707/999.003,
707/999.004, 999.005, 999.006
See application file for complete search history.

(56) References Cited

U.S. PATENT DOCUMENTS

| 5,659,766 | A  | * | 8/1997  | Saund et al. ..................... 704/9   |
| 5,687,364 | A  | * | 11/1997 | Saund et al. ..................... 704/5   |
| 6,052,657 | A  | * | 4/2000  | Yamron et al. .................... 704/9   |
| 6,223,145 | B1 | * | 4/2001  | Hearst ............................. 703/22 |
| 6,297,824 | B1 | * | 10/2001 | Hearst et al. .................. 715/848   |
| 6,404,925 | B1 | * | 6/2002  | Foote et al. ................... 382/224   |
| 6,529,902 | B1 | * | 3/2003  | Kanevsky et al. .................... 1/1   |
| 7,738,778 | B2 | * | 6/2010  | Agnihotri et al. ............. 386/231     |

(Continued)

FOREIGN PATENT DOCUMENTS

| JP | 2005167452 A | 6/2005 |
| JP | 2007052307 A | 3/2007 |
| WO | 2005069158 A | 7/2005 |

OTHER PUBLICATIONS

Koshinaka, T. Iso, K. Okumura, A. "An HMM-based Text Segmentation Method Using Variational Bayes Approach and Its Application to LVCSR for Broadcast News" pp. 485-488. Mar. 18-23, 2005. (ICASSP' 05).*

(Continued)

*Primary Examiner* — Jose Couso

(57) ABSTRACT

There is provided an apparatus including a model based topic segmentation section that when segments a text using a topic model representing semantic coherence, a parameter estimation section that estimates a control parameter used in segmenting the text based on detection of a change point of word distribution in the text, using the result of segmentation by the model based topic segmentation unit as training data, and a change point detection topic segmentation section that segments the text, based on detection of the change point of word distribution in the text, using the parameter estimated by the parameter estimation section.

32 Claims, 12 Drawing Sheets

U.S. PATENT DOCUMENTS

| | | | |
|---|---|---|---|
| 7,801,358 B2* | 9/2010 | Furmaniak et al. | 382/180 |
| 2003/0187642 A1* | 10/2003 | Ponceleon et al. | 704/252 |
| 2007/0162272 A1* | 7/2007 | Koshinaka | 704/9 |

OTHER PUBLICATIONS

D.M. Blei and P.J. Moreno, "Topic segmentation with an aspect hidden Markov model," in Proc. ACM SIGIR Conf. R&D in Information Retrieval, 2001, pp. 343-348.*

Masao Utiyama, Hitoshi Isahara, A statistical model for domain-independent text segmentation, Proceedings of the 39th Annual Meeting on Association for Computational Linguistics, p. 499-506, Jul. 6-11, 2001, Toulouse, France.*

Hearst, Marti A., "Multi-Paragraph Segmentation of Expositiory Text", 32nd. Annual Meeting of the Association for Computational Linguistics, pp. 9-16, 1994.*

International Search Report for PCT/JP2008/073502 mailed Feb. 3, 2009.

M. A. Hearst, "Multi-Paragraph Segmentation of Expository Text", 32nd Annual Meeting of the Association for Computational Linguistics, 1994, pp. 9-16.

J. P. Yamron et al., "A Hidden Markov Model Approach to Text Segmentation and Event Tracking", IEEE International Conference on Acoustics, Speech and Signal Processing, 1998, pp. 333-336.

T. Koshinaka et al., "An HMM-Based Text Segmentation Method Using Variational Bayes Inference and Its Application to Audio-Visual Indexing", Journal for Treatises of Society of Electronic Information Communication, vol. J89-D, No. 9, 2006, pp. 2113-2122.

Japanese Office Action for JP2009-548054 mailed on Dec. 25, 2012.

Takafumi Koshinaka, Ken-ichi Iso, and Akitoshi Okumura, "An HMM-based text segmentation method using variational Bayes approach", IPSJ SIG Technical Report vol. 2004 No. 57, Japan, Information Processing Society of Japan, May 28, 2004, vol. 2004, No. 57, p. 49-54.

Yasuhiro Tajima, Daizo Kitade, Michiko Nakano, Koji Fujimoto, Tomo Nakabayashi, and Yoshiyuki Kotani, "A dialogue segmentation method via uterance based HMM", IEICE Technical Report vol. 107 No. 158, Japan, The Institute of Electronics, Information and Communication Engineers, Jul. 17, 2007, vol. 107, No. 158, p. 7-12.

* cited by examiner

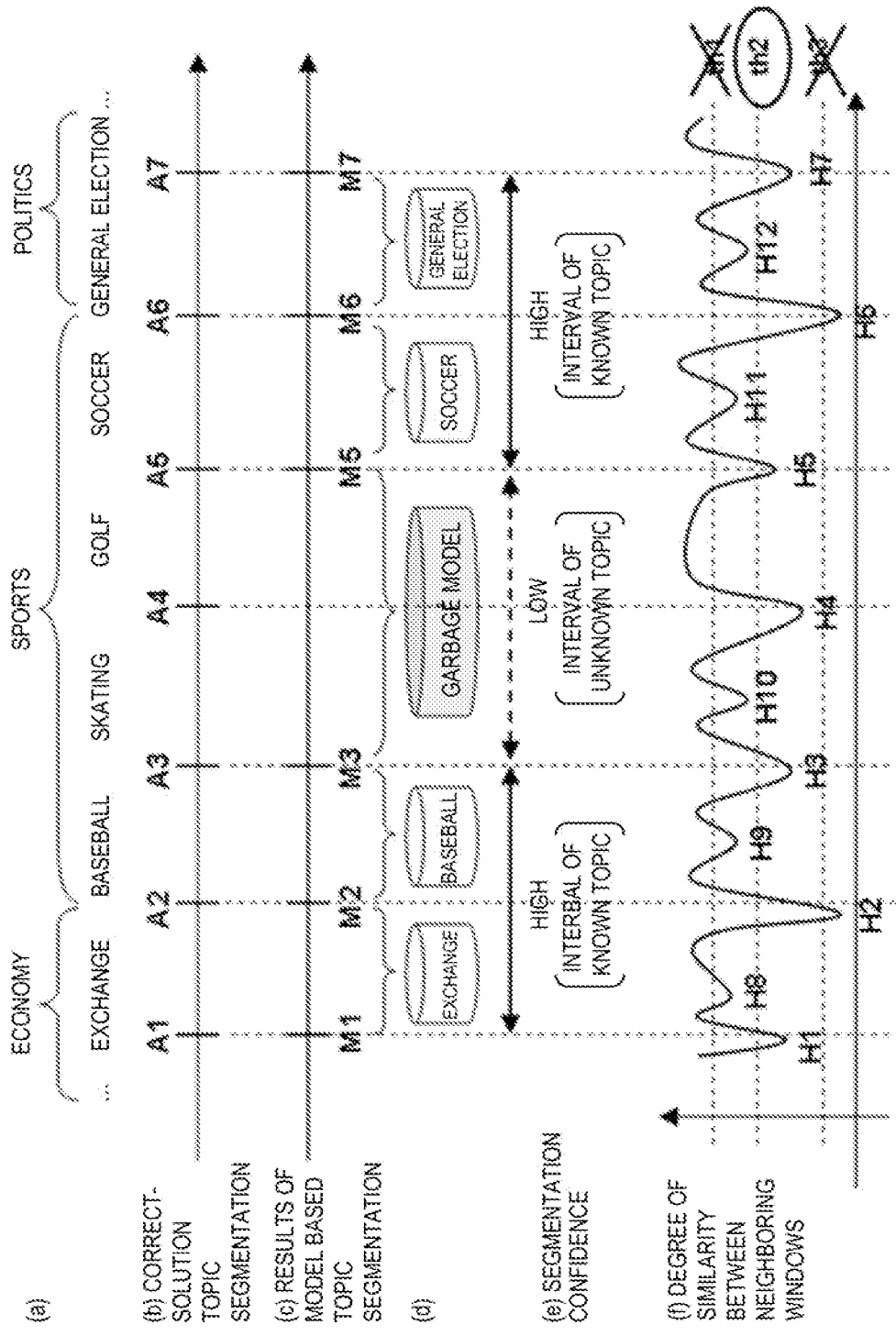

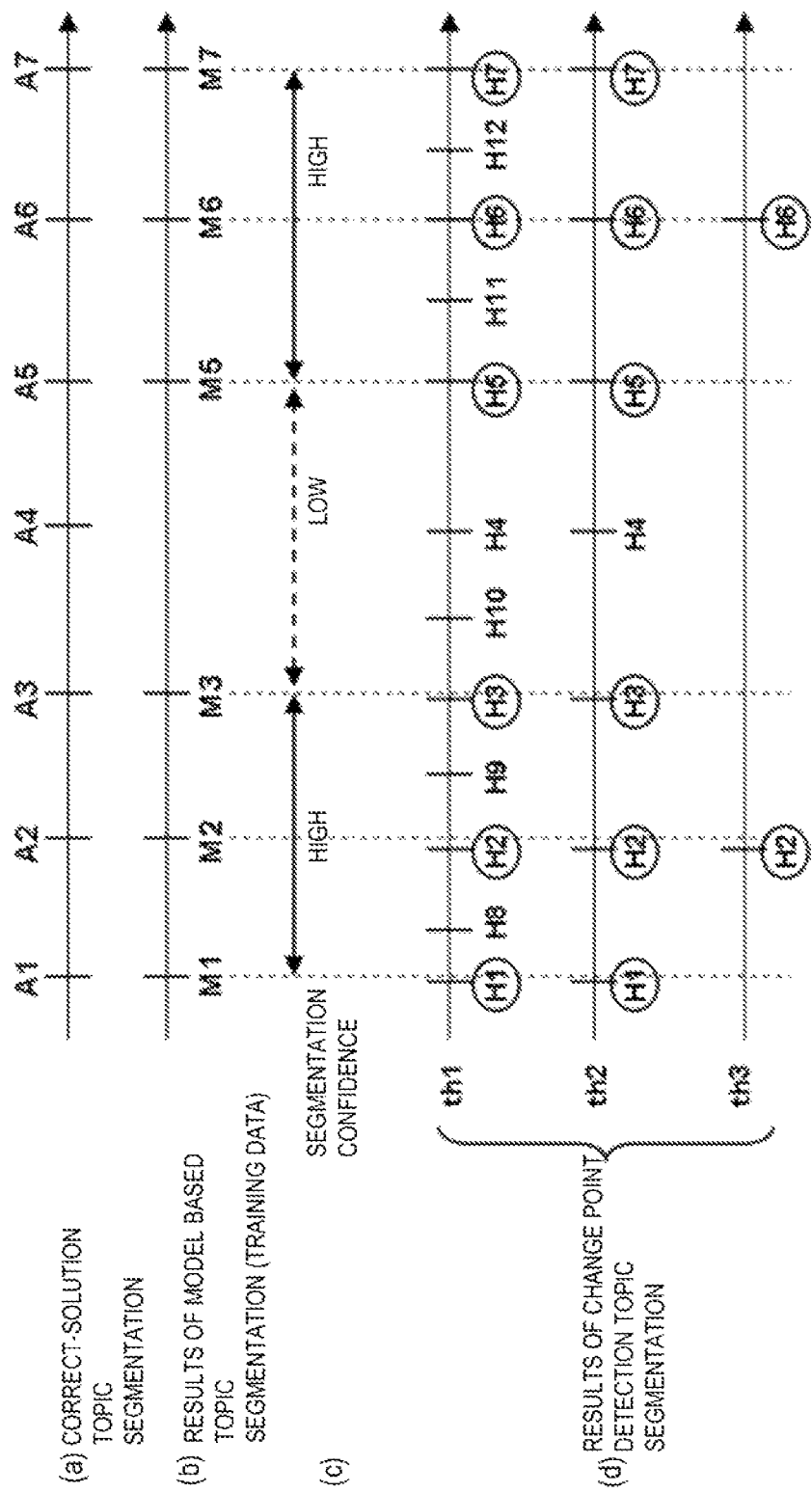

FIG. 7A

|     | Recall      | Precision    | F-value |
|-----|-------------|--------------|---------|
| th1 | 6 / 6 = 1.0 | 6 / 12 = 0.5 | 0.67    |
| th2 | 6 / 6 = 1.0 | 6 / 7 = 0.86 | 0.92    |
| th3 | 2 / 6 = 0.33| 2 / 2 = 1.0  | 0.50    |

ENTIRE INTERVALS ARE TRAINING DATA

FIG. 7B

|     | Recall      | Precision     | F-value |
|-----|-------------|---------------|---------|
| th1 | 6 / 6 = 1.0 | 6 / 10 = 0.64 | 0.78    |
| th2 | 6 / 6 = 1.0 | 6 / 6 = 1.0   | 1.0     |
| th3 | 2 / 6 = 0.33| 2 / 2 = 1.0   | 0.50    |

A HIGH CONFIDENCE INTERVAL IS TRAINING DATA

APPARATUS, METHOD AND PROGRAM FOR TEXT SEGMENTATION

This application is the National Phase of PCT/JP2008/073502, filed Dec. 25, 2008, which claims priority rights based on the JP Patent Application No. 2007-336400 filed in Japan on Dec. 27, 2007. The total disclosures of the Patent Application of the senior filing data are to be incorporated by reference herein.

TECHNICAL FIELD

This invention relates to a technique for segmenting a text. In particular, it relates to an apparatus, a method and a program for segmenting a text, composed of strings of words or letters/characters, in terms of a topic having semantic coherence as a unit.

BACKGROUND

The text segmentation technique for segmenting a text, composed of strings of words or letters/characters, in terms of a topic having semantic coherence as a unit, is among the critical fundamental techniques in the processing of natural languages. By segmenting a text by each topic, it becomes possible to classify a huge amount of text into each topic, extract a entire structure of the text, and prepare summaries of the respective topics.

On the other hand, video contents are being distributed in larger quantities. Text segmentation may be used in preparing a written text of the speech contained in an image or in a text representing the results of speech recognition in such a manner as to improve the ease in viewing or retrieving the video contents. Thus, the importance of the text segmentation technique is increasing.

The technique for text segmentation may roughly be classified into two techniques. These two techniques are now described in detail with reference to the drawings.

The first one detects, as a boundary between topics, a change point of word distribution in an input text targeted for segmentation. This technique postulates that the same word distribution will persist in an interval belonging to the same topic in the input text. A representative example of the first technique is the Hearst method stated in Non-Patent Document 1 (first related technique).

FIG. 10 schematically shows the operation of the Hearst method. Referring to FIG. 10, the Hearst method sets a window of a constant width for each section of the input text, and finds the word distribution in each window. The word distribution in one of the windows and that in the neighboring window are compared to each other to detect a point of abrupt change in the word distribution. This point is taken to be the word boundary. As the word distribution, a unigram found on counting the frequency of occurrences of a given word in the window is often used. Alternatively, the frequency of occurrences of doublet, triplet or the like of neighboring words may be used as the word distribution. To detect the point of abrupt change in the window, it is sufficient that the degree of similarity of word distributions of neighboring windows is found by, for example, cosine similarity, and such a point where the locally minimum point of a sequence of the values of the degree of similarity is less than or equal to a threshold value is found. If, in FIG. 10, th2 is set as the threshold value of the degree of similarity, segmentation points H1 to H7 are obtained. If th3 is set as the threshold value of the degree of similarity, segmentation points H2 and H6 are obtained.

It is seen from above that, with the Hearst method, some form of the results of segmentation or other may be output irrespectively of what input text has been presented.

However, in the Hearst method, there are a variety of parameters that control the results of segmentation, such as window width, threshold value of the degree of similarity or the number of times of operations performed for smoothing the values of the degree of similarity. Depending on the values of these parameters, the sorts of the topic units into which the input text is segmented are changed.

A second one of the techniques for text segmentation has the knowledge relating a variety of topics and utilizes the knowledge for segmenting the input text into respective topics. An example of this second technique is shown in Non-Patent Document 2.

FIG. 11 schematically shows the operation of the technique disclosed in Non-Patent Document 2 (second related technique). Referring to FIG. 11, the technique disclosed in the Non-Patent Document 2 learns statistical models, that is, topic models, concerning a variety of topics such as 'baseball' or 'exchange', at the outset, using a text corpus segmented on a per topic basis, such as a newspaper article. As the topic model, a unigram model that has learned the frequency of occurrences of a word appearing in each topic may, for example, be used. If the liability of the occurrence of a transition between topics is set as appropriate, a sequence of topic models, optimally matched to the input text, may then be found along with the positions of change points of the topics. That is, the input text may be segmented into topic units. The input text may be coordinated to the topic units by a method of computations, exemplified by a frame synchronization search, in a manner similar to the technique frequently used in speech recognition. Making correspondence between the input text and the topic models is similar to that between the input speech waveform and phoneme models which are in a wide spread use in the technique of speech recognition.

In this manner, an interval in the input text relating to the topics whose topic models are provided in advance, may be segmented with these topic models as topic units. Referring to FIG. 11, the topic models of the 'baseball', 'exchange', 'soccer' and the 'general election', provided in advance, are matched to corresponding intervals of the input text. The input text may thus be segmented into these respective topics to give segmentation points M1 to M3 and M5 to M7.

Patent Document 1 discloses a technique that combines the feature of the first technique of detecting a change point of the word distribution in the input text and the feature of the second technique of utilizing the knowledge concerning a topic in order to segment the input text on a per topic basis. The invention disclosed in Patent Document 1 will now be described in detail as the third related technique.

In the invention disclosed in Patent Document 1, the time series of the text, obtained from caption or speech in a video, are segmented on a per topic basis, with a view to segmenting the video on per topic basis. It is postulated that some text information or other regarding each topic is obtained beforehand by way of providing the knowledge regarding each topic which is desired to be obtained as being the result of segmentation. This text information regarding each topic is referred to below as script data.

The operation of the invention disclosed in Patent Document 1 is now briefly described. Initially, the time series of the text, extracted from the image, are segmented in accordance with the first technique. It is then verified whether or not the text of each interval resulting from segmentation is similar to the text information regarding each topic obtained from the script data. The interval not similar to any of the topics in the script data is repeatedly subjected to finer segmentation by the first technique.

Taking the case of segmenting a news program into individual news items, the operation of the invention disclosed in Patent Document 1 will now be described in detail with reference to the drawings.

FIG. 12 is a diagram showing a configuration of FIG. 2 of Patent Document 1. It should be noted that in FIG. 12, the reference numerals used therein differ from those of FIG. 2 of Patent Document 1. Referring to FIG. 12, a news program which is a target for segmentation is stored in a video data memory 602. The title text of each news item is stored in a script data memory 601 as the text information regarding each news item as the topic unit desired to be obtained as being the results of segmentation.

Initially, a script text interval acquisition means 603 refers to the script data memory 601 to acquire a title text of each news item.

A video text interval generation means 604 then segments the time series of the text, as obtained from the caption or the speech in the news program by the first technique, that is, by the technique of detecting the change point of the word distribution, using a suitable parameter. The text of each interval, resulting from segmentation, is output as the video text interval.

A text similarity degree computing means 605 then computes the degree of similarity between the text of each video text interval, resulting from segmentation by the video text interval generating means 604, and the title text of each news item as obtained by the script text interval acquisition means 603.

A text associating means 606 associates to each video text interval a news item that has a title text most similar to the text of the interval in question. The degree of similarity is to be higher than a preset threshold value.

A recursive processing control means 607 changes the parameter for the video text interval not associated with the news item by the text associating means 606. The parameter is to be changed so as to allow for more fine-grained segmentation by the video text interval generating means 604. The recursive processing control means 607 then causes the processing by the video text interval generating means 604, text similarity degree computing means 605 and the text associating means 606 to be performed repeatedly.

When the news items are associated with all of the video text intervals, or the parameter has reached a preset limit value, the iteration processing is brought to an end.

In case the same news item corresponds to neighboring video text intervals, a video text interval integrating means 608 integrates these intervals into one and outputs the so integrated intervals as the final result of segmentation.

Non-Patent Document 1:
Marti A. Hearst, "MULTI-PARAGRAPH segmentation of expository text," 32nd Annual Meeting of the Association for Computational Linguistics, pp. 9-16, 1994

Non-Patent Document 2:
Yarmon, I. Carp, L. Gilick, S. Lowe and P van Mulbregt, "A hidden markov model approach to text segmentation and event tracking", IEEE International Conference on Acoustics, Speech and Signal Processing, pp. 333 to 336, 1998

Non-Patent Document 3:
Takafumi Koshinaka, Akitoshi Okumura and Ryosuke Isotani, "An HMM-Based Text Segmentation Method Using Variational Vayes Inference and Its Application to Visual Indexing", Journal for Treatises of Society of Electronic Information Communication, vol. J89-D, No. 9, pp. 2113-2122, 2006

Patent Document 1: JP Patent Kokai JP-A-2005-167452 (FIG. 2)

SUMMARY

The disclosures of the Non-Patent Documents 1 to 3 and the Patent Document 1 are to be incorporated by reference herein. The following is an analysis of the related techniques by the present invention.

The above mentioned first to third related arts have problems given below:

The first related art has a problem that it is difficult to segment the input text into topic units as desired. The topic units desired mean topic units desired to be obtained as being the results of segmentation. For example, the topic units desired in case of segmenting the text of a news program may include individual news item units and news genre units.

As described above, in the first related art, into which topic units an input text is segmented is varied if parameters, such as window widths or threshold values for the degree of similarity, are changed. It is not clear which parameter value is to be set in order to obtain topic units as desired. This accounts for the difficulty met in the first related art in segmenting the input text into topic units as desired. A specified example will now be described.

If, in the example shown in FIG. 10, the threshold value of the degree of similarity is set to th3, segmentation points H2 and H6 are obtained. The input text is segmented into news genres of 'economy', 'sports' and 'politics' as topic units.

On the other hand, if, in the example of FIG. 10, the threshold value of the degree of similarity is set to Th2, segmentation points H1 to H7 are obtained, thus segmenting the input text into individual news items. Further, if the threshold value of the degree of similarity is set to Th1, H8 to H12 are also segmentation points, thus segmenting the input text into finer units.

Even when it is desired to segment the input text into individual news items as desired topic units, it is difficult to properly set th2 as the threshold value for the degree of similarity. As a result, the input text is segmented in terms of units differing from desired topic units.

In other words, in the first related art, it is not known at the outset into which topic units the input text will be segmented, thus presenting a matter of serious concern from the practical point of view.

This applies for the setting of other parameters, such as window widths. On the other hand, even granting that a proper parameter value, by which an input text can be segmented on per a desirable topic basis, has been set with success, another text of an entirely different nature can not necessarily be segmented by the same parameter value. The above problem is severer in case of dealing with a variety of sorts of input texts. It is apparent that the optimum parameter value differs from one input text to another, in consideration that an optimum value of the window width depends on the time duration of dealing with a topic in question.

The second related art has a problem that, if an unknown topic, for which a topic model has not been provided with success, presents itself in an input text, the corresponding interval may not be segmented correctly.

For example, in an example shown in FIG. 11, topic models regarding 'exchange', 'baseball', 'soccer' and 'general election' are provided as corresponding topic models for the intervals A1 to A3 and A5 to A7 in the input text, and hence these intervals can be segmented in terms of these topics as units. However, no corresponding topic models are provided for the intervals A3 to A5 (see 'intervals of unknown topics' of FIG. 11), and hence these intervals may not be segmented correctly.

It is practically not possible to provide topic models as all topics are presupposed at the outset. Thus, in the second related art, practically undesirable problems are presented in dealing with a variety of input texts.

The third related art has a problem that, in case a topic, for which the text information has not been provided as script data with success, should present itself in the input text, the corresponding interval may not be segmented correctly. This problem is similar in nature to the problem as met in the second related art. The reason is that, in the third related art, the interval which is not associated with any topic in the script data is segmented into sub-intervals by the recursive processing until the parameter reaches its limit value. As a result, how an interval which is not associated with any topic in the script data is segmented is determined by the preset limit parameter value. It is not possible to properly set the ultimate parameter value beforehand for an interval not associated with any topic in the script data. Hence, only non-optimum results of segmentation may be obtained.

It is therefore an object of the present invention to provide an apparatus, a method and a program for segmenting an input text according to which the input text may properly be segmented into topic units as desired.

The invention may be summarized substantially as follows, though not limited thereto:

In one aspect, there is provided a text segmentation apparatus for segmenting a text into a plurality of intervals according to the present invention comprises a parameter estimation section that estimates a parameter used in segmenting the text, based on detection of a change point in word distribution in the text, using a result of segmentation attached to the text as training data (a teacher); and a change point detection topic segmentation section that segments the text, based on detection of the change point in word distribution in the text, using the parameter estimated by the parameter estimation section.

In another aspect, the text segmentation apparatus according to the present invention may comprise:

a topic model storage device that stores a topic model representing a semantic coherence; and a model base topic segmentation section that segments the text in association with a topic, using the topic model; and a parameter estimation section that estimates a parameter used in the change point detection topic segmentation section, using the result of segmentation of the text by the model base topic segmentation section as training data.

In the text segmentation apparatus according to a further aspect of the present invention, the model base topic segmentation section outputs a segmentation confidence representing the degree of certainty of the segmentation of the text to at least one interval obtained on segmentation of the text in association with a topic.

The parameter estimation section may estimates the parameter used by the change point detection topic segmentation section, in an interval of a higher segmentation confidence, using the result of segmentation by the model base topic segmentation section as training data.

In the text segmentation apparatus according to the present invention, the parameter estimation section may estimate a parameter used by the change point detection topic segmentation section to segment a segmentation target interval of the text, using the result of segmentation by the model base topic segmentation section for a range of the segmentation target interval plus a preset range extended from the segmentation target interval of the text as training data.

The text segmentation apparatus according to the present invention may further comprise a segmentation result integration section that outputs the result of segmentation by the model base topic segmentation section in an interval of a higher segmentation confidence from among a plurality of intervals obtained on segmentation of the text and that outputs the result of segmentation by the change point detection topic segmentation section in an interval of a lower segmentation confidence.

In the text segmentation apparatus according to the present invention, the model base topic segmentation section may output the segmentation confidence of a higher value for an interval in the text regarding a topic represented by any of the topic models stored in the topic model storage device, and the model base topic segmentation section may output the segmentation confidence of a lower value for an interval in the text regarding a topic not corresponding to any topic represented by the topic model stored in the topic model storage device.

In the text segmentation apparatus according to the present invention, the model base topic segmentation section may decide an interval, matched to a garbage model not representing a specified topic, to be an interval regarding a topic not corresponding to any topic represented by a topic model stored in the topic model storage device, and outputs the segmentation confidence of a lower value for the interval.

In the text segmentation apparatus according to the present invention, the model base topic segmentation section computes the segmentation confidence for at least one interval obtained on segmenting the text in association with the topic by a likelihood of the topic model or an entropy of an a posteriori probability of the topic model.

In the text segmentation apparatus according to the present invention, in case the segmentation target interval includes a plurality of intervals, the parameter estimation section may estimate a parameter used by the change point detection topic segmentation section in segmenting the segmentation target interval into the intervals, using the result of segmentation by the model base topic segmentation section for a range of the segmentation target interval plus a preset range extended from the segmentation target interval as training data.

The change point detection topic segmentation section may segment the segmentation target interval into the intervals, using a parameter estimated for the segmentation target interval by the parameter estimation section.

The text segmentation apparatus according to the present invention may further comprise a segmentation target interval determination section that determines an interval of a lower segmentation confidence to be a segmentation target interval of the text to be segmented by the change point detection topic segmentation section. The change point detection topic segmentation section may segment the segmentation target interval determined by the segmentation target interval determination section.

In the text segmentation apparatus according to the present invention, the parameter estimation section, when regarding the result of segmentation by the model base topic segmentation section to be a correct solution, may estimate the parameter so that the segmentation correct-solution accuracy of the result of segmentation by the change point detection topic segmentation section will be high.

A method for segmenting a text into a plurality of intervals according to the present invention comprises a parameter estimation step of estimating a parameter in segmenting the text, based on detection of a change point of word distribution in the text, using a result of segmentation attached to the text as training data, and a change point detection topic segmentation step of segmenting the text, based on detection of a change point of word distribution in the text, using the parameter estimated in the parameter estimation step.

A method according to the present invention may comprise:

a model based topic segmentation step of referencing a topic model storage device that stores a topic model representing semantic cohesion and segmenting the text in association with a topic using the topic model;

a parameter estimation step of estimating a parameter used in segmenting the text based on detection of a change point of word distribution in the text, using result of segmentation of the text by the model based topic segmentation step as training data; and a change point detection topic segmentation step of segmenting the text based on detection of a change point of word distribution in the text, using the parameter estimated in the parameter estimation step. The present invention also provides methods corresponding to the contents of the apparatus explained above as the further aspect of the present invention.

A program according to the present invention causes a computer, segmenting a text into a plurality of intervals, to execute a parameter estimation processing that estimates a parameter used in segmenting the text, based on detection of a change point in word distribution in the text, using a result of segmentation attached to the text as training data, and a change point detection topic segmentation processing that segments the text, based on detection of the change point in word distribution in the text, using the parameter estimated by the parameter estimation section.

A program according to the present invention causes a computer that performs segmentation of a text into a plurality of intervals, to execute:

a model based topic segmentation processing that references a topic model storage device that stores a topic model representing semantic coherence, segments the text in association with the topic, with the aid of the topic model;

a parameter estimation processing that estimates a parameter used in segmenting the text based on detection of a change point of word distribution in the text, using result of segmentation of the text by the model based topic segmentation processing as training data; and a change point detection topic segmentation processing that segments the text based on detection of a change point of word distribution in the text, using the parameter estimated in the parameter estimation processing. With the method of the present invention, there may be provided a program corresponding to the contents described as a further aspect of the apparatus according the present invention. According to the present invention, there is provided a computer-readable storage medium storing the above described program according to the present invention.

According to the present invention, an input text can be optimally segmented into desired topic units. The reason is that, according to the present invention, the parameter for segmenting the input text into desired topic units may be estimated to render it possible to output the results of segmentation for any input text.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 5 is a schematic view showing an example operation of the first exemplary embodiment of the present invention.

FIG. 6 is a schematic view showing an example operation of a parameter estimation section according to the first exemplary embodiment of the present invention.

FIGS. 7A and 7B are diagrammatic views showing an example operation of the parameter estimation section according to the first exemplary embodiment of the present invention.

PREFERRED MODES

Preferred exemplary embodiments of the present invention will now be described with reference to the drawings. A text segmentation apparatus according to the present invention includes a topic model storage device (101 of FIG. 1) that stores one or more topic models, each representing a semantic coherence, a model base topic segmentation section (102 of FIG. 1) that segments the text in association with topics, using the topic models, a parameter estimation section (103 of FIG. 1) that estimates a control parameter used in segmenting the text, based on detection of a change point of word distribution in the text, using the result of segmentation by the model base topic segmentation means as training data, and a change point detection topic segmentation section (104 of FIG. 1) that segments the text, based on detection of the change point of word distribution in the text, using the parameter estimated by the parameter estimation section.

The parameter estimation section (103 of FIG. 1) estimates the parameter used in the change point detection topic segmentation section (104 of FIG. 1), using the result of segmentation of the input text by the model base topic segmentation section (102 of FIG. 1) as training data.

Figure 1:
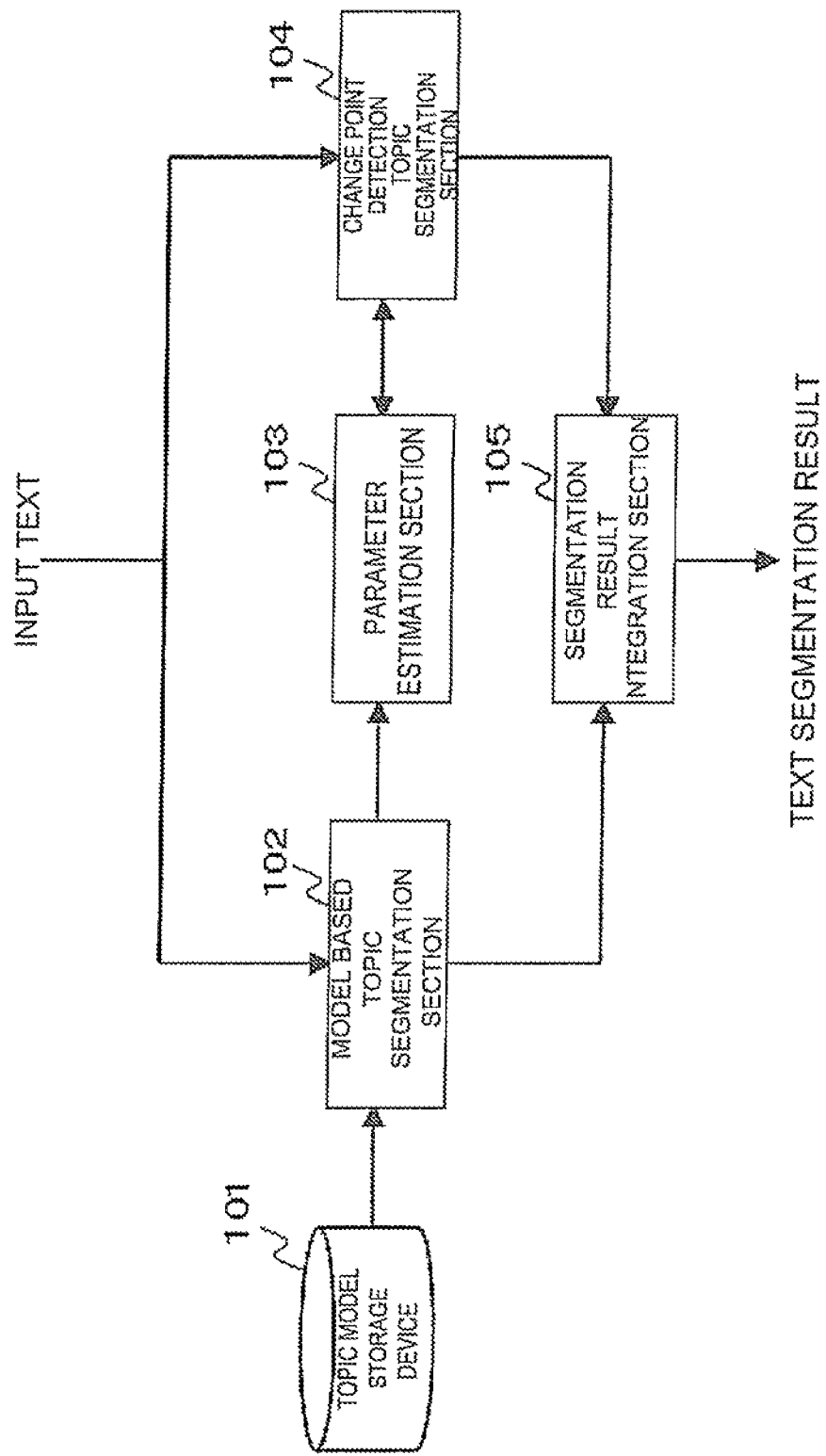
FIG. 1 is a diagram showing a configuration of a first exemplary embodiment of the present invention.

The change point detection topic segmentation section (104 of FIG. 1) segments the input text using the parameter estimated by the parameter estimation section (103 of FIG. 1).

A first exemplary embodiment of the present invention will now be described in detail with reference to the drawings. FIG. 1 shows a configuration of the first exemplary embodiment of the present invention.

Referring to FIG. 1, in the first exemplary embodiment of the present invention, there is provided an apparatus for segmenting an input text into a plurality of intervals. The apparatus includes a topic model storage device 101, the model base topic segmentation section 102, a parameter estimation section 103, a change point detection topic segmentation section 104, and a segmentation result integration section 105.

These sections operate substantially as follows:

The model base topic segmentation section 102 segments an input text on a per topic basis, using a topic model stored in the topic model storage device 101.

The parameter estimation section 103 then estimates a parameter that controls the operation of the change point detection topic segmentation section 104, using the result of segmentation by the model base topic segmentation section 102 as training data.

The change point detection topic segmentation section 104 then detects a change point in the word distribution in the text, using the parameter which has been estimated by the parameter estimation section 103, thereby segmenting the input text.

Finally, the segmentation result integration section 105 integrates the result of segmentation by the model base topic segmentation section 102 and the result of segmentation by the change point detection topic segmentation section 104 to output the final result of segmentation of the input text.

Figure 3:
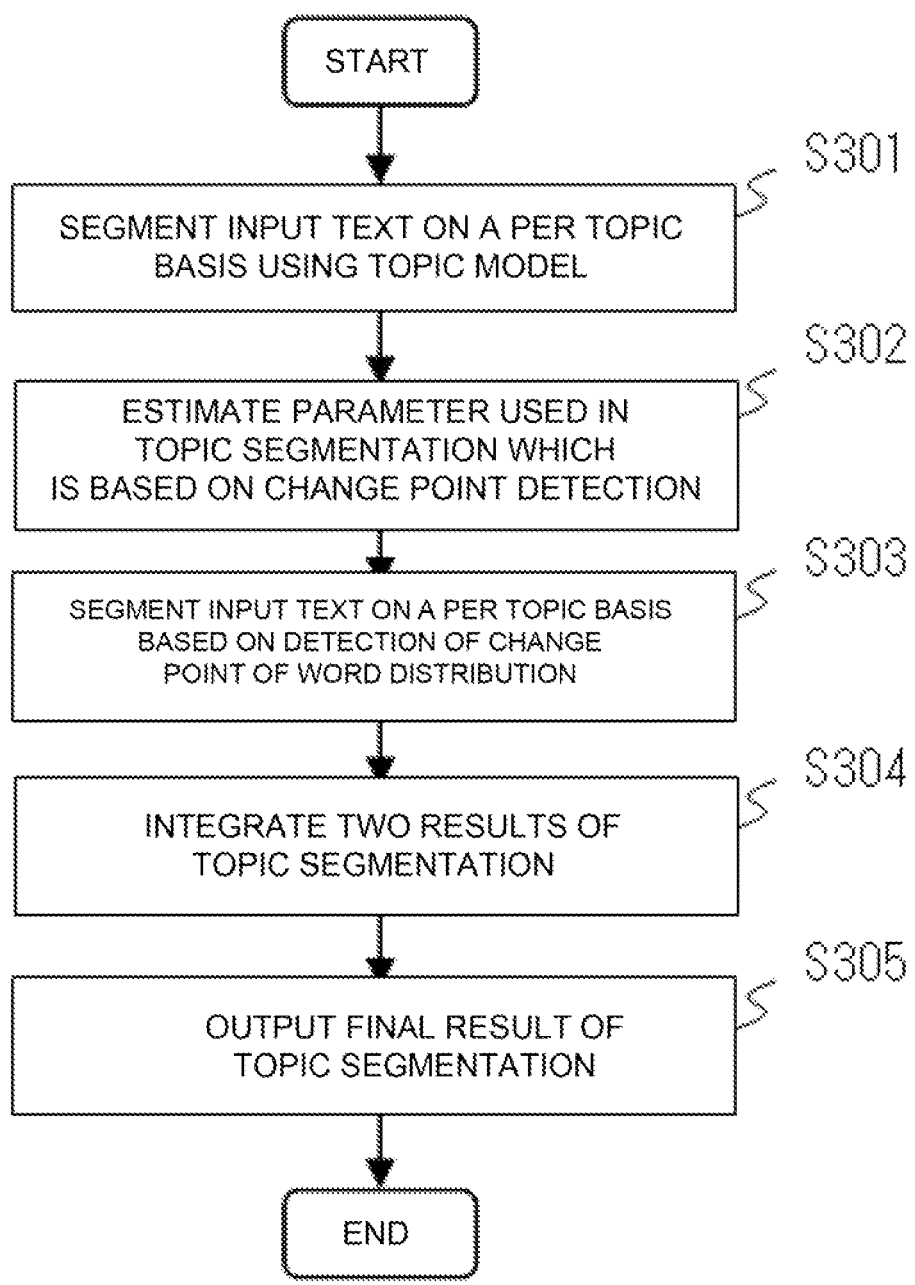
FIG. 3 is a flowchart for illustrating the operation of the first exemplary embodiment of the present invention.

FIG. 3 is a flowchart for illustrating the operation of the present a first exemplary embodiment. Referring to FIGS. 1 and 3, the overall operation of the present exemplary embodiment will be described in detail.

An input text being segmented may include an array of optional letters/characters or words, or time-series of commands during the computer operation. In the present exemplary embodiment, the input text includes a sequence of a plurality of words, only by way of illustration. If the input is a text of a language not segmented on the word basis, such as a text in Japanese, a morpheme-based analysis method, as known per se, may be applied to the input text, and the text thus segmented into sets of words as units in advance may then be used as the input text. A sequence of words in an input text may be freed at the outset of adjuncts or auxiliary verbs, not directly relevant to the topic, and the resulting sequence may then be used as the input text.

In the present exemplary embodiment, a plurality of topic models, configured to deal with desired topic units in segmenting the input text, are provided and stored in the topic model storage device 101. For example, if the text relating with a news is to be segmented and a plurality of topic models are to be provided from one news genre, such as 'sports' or 'politics', to another, topic models belonging to respective news genres, such as 'exchange', 'baseball' or 'general election', are provided. For these topic models, it is sufficient to use models, such as unigrams or bigrams, representing the probability of occurrence of a word or a doublet of words appearing in each such topic. These topic models may be learned using a large amount of data classified in advance on a per topic basis, for example, data of newspaper articles. It should be noted that it is practically not possible to provide the topic models related to the total of topics in advance and get them stored in the topic model storage device 101.

In the following, the topics represented by any of the topic models stored in the topic model storage device 101 are labeled 'known topics', while those not represented by any of the topic models stored in the topic model storage device 101, viz., the topics for which no topic models are provided, are labeled the 'unknown topics'.

In segmenting the input text, the model base topic segmentation section 102 segments an input text, using the topic model stored in the topic model storage device 101 (step S301 of FIG. 3). In segmenting the input text by the model base topic segmentation section 102, the topic model sequence best matched to the input text may be found, along with the positions of the change points of the topics, using the above mentioned second related art.

More specifically, the sequence of topic models, matched to the input text, may be found by, for example, a frame synchronized beam search method employing a HMM (Hidden Markov Model) in which each topic model is arranged in each state. In this case, it is necessary to determine the values of the transition probability between the different topics. The values of the transition probability between the topics may be determined by learning based on an array of the respective topics in text data used in learning the topic models. Alternatively, the values of the transition probability between the topics may be set so as to be equal to one another.

The model base topic segmentation section 102 segments each interval of a known topic in the input text into topic units as desired. On the other hand, an interval of an unknown topic in the input text is not matched to any topic model provided and hence may not be segmented correctly. It is thus not known which segmented result will be obtained.

In the present exemplary embodiment, the model base topic segmentation section 102 not only segments the input text on a per topic basis, but may be operated in such a way as to conclude which interval in the input text is the interval of an unknown topic. In this case, in order for the model base topic segmentation section 102 to determine the interval of an unknown topic, a garbage model, not representing any specified topic, is provided. In segmenting the input text, not only the topic model, stored in the topic model storage device 101, but also the garbage model provided in advance, is used to determine the interval of an unknown topic. That is, since the garbage model is matched to the interval of an unknown topic better than the other topic intervals, it may be concluded that the interval matched to the garbage model is the interval of an unknown topic. On the contrary, the interval to which the other topic model matched may be determined to be the interval of a known topic.

The garbage model used may be exemplified by a model in which the probabilities of occurrences of entire words are equal, and a model that represents the probabilities of occurrences of respective words in a voluminous text data containing a variety of topics.

The parameter estimation section 103 then estimates a parameter used by the change point detection topic segmentation section 104 in segmenting the text, using the result of segmentation by the model base topic segmentation section 102 as training data (step S302 of FIG. 3). To estimate the parameter, it is sufficient that the change point detection topic segmentation section 104 segments the input text into a plurality of intervals using a large variety of parameters, and that such a parameter is then found that will allow the change point detection topic segmentation section 104 to optimally reproduce the result of segmentation by the model base topic segmentation section 102. By so doing, the parameter estimation section 103 is able to estimate a parameter value which will allow the change point detection topic segmentation section 104 to segment any interval of the input text into topic units more approximate to a desired result.

The change point detection topic segmentation section 104 detects a change point of the word distribution in the input text, using the parameter estimated by the parameter estimation section 103, thereby segmenting the input text (step S303 of FIG. 3). In the present exemplary embodiment, the change point detection topic segmentation section 104 differs from the case of the above mentioned first related art in detecting the change point in the word distribution of the input text using the parameter from the parameter estimation section 103. However, the operation of detection of the change point per se in the present exemplary embodiment is similar to that of the first related art. It is possible for the change point detection topic segmentation section 104 to segment every interval of the input text. However, if an optimum result of segmentation is to be output, it is necessary to determine the parameter correctly, as already described in connection with the first related art.

In the present exemplary embodiment, the parameter estimation section 103 estimates a parameter value that will allow the change point detection topic segmentation section 104 to segment any interval in the input text into topic units more approximate to a desired result, and the change point detection topic segmentation section 104 segments the input text using the parameter estimated by the parameter estimation section 103. Hence, any given interval in the input text may be segmented into topic units more approximate to a desired result.

Finally, the segmentation result integration section 105 integrates the result of segmentation by the model base topic segmentation section 102 and the result of segmentation by the change point detection topic segmentation section 104 (step S304 of FIG. 3) to output the result of integration of the two results of segmentation as the final result of segmentation of the input text (step S305 of FIG. 3).

As a method for integrating the two results of segmentation to output the integrated result, it is sufficient that the result of segmentation by the change point detection topic segmentation section 104 is output for an interval determined to be the interval of an unknown topic by the model base topic segmentation means 102, and that the result of segmentation by the model base topic segmentation section 102 is output for an interval determined to be the interval of a known topic by the model base topic segmentation section 102.

By so doing, the interval of a known topic may be reliably segmented by the model base topic segmentation section 102 in terms of desired topic units, while the interval of an unknown topic may reliably be dealt with by the change point detection topic segmentation section 104 in terms of topic units more approximate to desired topic units.

It is noted that the segmentation result integration section 105 may directly output the result of segmentation by the change point detection topic segmentation section 104, in each of the entire intervals of the input text, in place of integrating the result of segmentation by the model base topic segmentation section 102 and the result of segmentation by the change point detection topic segmentation section 104.

Referring to FIGS. 1 and 5 to 7, the operation of the present exemplary embodiment will be described with reference to specified examples.

The following description is directed to the example of segmenting a text regarding a news including the topics shown in (a) of FIG. 5. It is assumed that the topic unit as desired is an individual news item. In FIG. 5, the abscissa stands for a text expanded uni-dimensionally.

It is assumed to be desirable that segmentation points A1 through to A7, shown as 'correct-solution topic segmentation' in (b) of FIG. 5 are obtained as a final result of segmentation.

It is also assumed that, in the topic model storage device 101, topic models of 'exchange', 'baseball', 'soccer' and 'general election' are stored in the topic model storage device 101 as desired topic models regarding the individual news items (see (d) of FIG. 5).

It is further assumed that, in the present exemplary embodiment, the change point detection topic segmentation section 104 segments the input text by the Hearst method described for example in Non-Patent Document 1. In the Hearst method, a window of a preset width is set for each portion of the input text, and the input text is segmented at a point where the locally minimum point of the degree of similarity of the word distribution between the neighboring windows is equal to or less than a threshold value.

Among the parameters of the Hearst method, there are
a window width;
a threshold value of the degree of similarity; and
the number of times of operations performed for smoothing the degree of similarity.

In this case, the parameters estimated by the parameter estimation section 103 are a window width, a threshold value for the degree of similarity and so forth. In the following description, it is presupposed that the input text is segmented in accordance with the Hearst method, only for illustration. It should be noted that the implementation of the change point detection topic segmentation section 104 is not to be limited to the Hearst method.

The model base topic segmentation section 102 of FIG. 1 segments the input text, using a topic model, thereby producing partitioning points M1 to M3 and M5 to M7, as indicated by 'results of model based topic segmentation' shown in (c) of FIG. 5.

In the results of model based topic segmentation of (c) of FIG. 5, the intervals M1 to M3 and the intervals M5 to M7 are known topic intervals. It is thus possible to segment the intervals in terms of the individual news items as units. On the other hand, as regards the interval M3 to M5, composed of two news items of 'skating' and 'golf', no topic models are provided for these topics. Hence, a garbage model is matched to the intervals M3 to M5, so that these intervals are determined to be intervals of unknown topics.

The parameter estimation section 103 of FIG. 1 then estimates the parameter used for segmentation by change point detection by the change point detection topic segmentation section 104, using the result of segmentation by the model base topic segmentation section 102 as training data. Here, since the change point detection topic segmentation section 104 segments the input text in accordance with the Hearst method, the parameter estimation section 103 estimates the parameters of the Hearst method.

The method for parameter estimation by the parameter estimation section 103 will now be described with reference to a case of estimating the threshold value of the degree of similarity among the parameters of the Hearst method.

The parameter estimation section 103 segments the input text, in accordance with the Hearst method, using a variety of different threshold values for the degree of similarity.

In (f) of FIG. 5, a sequence of the 'values of the degree of similarity of word distribution between neighboring windows' is shown in case the Hearst method is applied to the input text. Thus, if the change point detection topic segmentation section 104 segments the text using th1 as a threshold value for the degree of similarity, segmentation points H1, H8, H2, H9, H3, H10, H4, H5, H11, H6, H12 and H7 are obtained.

If the change point detection topic segmentation section 104 segments the input text using th2 (<th1) as a threshold value for the degree of similarity, segmentation points H1 through to H7 are obtained.

If the change point detection topic segmentation section 104 segments the input text using th3 (<th2) as a threshold value for the degree of similarity, segmentation points H2 and H6 are obtained.

At this time, the parameter estimation section 103 compares the segmentation points (M1 to M3 and M5 to M7) obtained by the model base topic segmentation section 102 and the segmentation points obtained by the change point detection topic segmentation section 104 in accordance with the Hearst Method with the use of respective threshold values for the degree of similarity. The threshold value for the degree of similarity, which will give the result of segmentation that optimally represent the result of segmentation by the model based topic segmentation, is then found.

To this end, it is sufficient to find a threshold value for the degree of similarity which, when the result of segmentation by the model base topic segmentation section 102 are taken to be a correct solution, will maximize the correct-solution segmentation accuracy of the result of segmentation by the Hearst method.

FIGS. 6 and 7 show schematic views for illustrating an example of this procedure. FIG. 6 shows the result of segmentation by the model base topic segmentation section 102, which may be used as training data, and the result of segmentation of the Hearst method by the change point detection topic segmentation section 104. It is observed that the latter results are those of change point detection topic segmentation by the change point detection topic segmentation section 104, with the use of the th1, th2 and th3 as threshold values for the degree of similarity ((d) of FIG. 6). It is also observed that those segmentation points, out of the segmentation points by the Hearst method, which may be regarded to be correct segmentation in case the segmentation points by the model based topic segmentation are taken to be a correct solution, are given with circle marks (O) (that is, the segmentation points are shown encircled by (O) in (d) of FIG. 6).

For example, it is shown that, from among the segmentation points by the Hearst method with the use of th1 as the threshold value of the degree of similarity, those segmentation points given with circle marks O, that is, H1 to H3 and H5 to H7, may be regarded as indicating correct segmentation.

In the present exemplary embodiment, it may occur that the segmentation points by the Hearst method, carried out by the change point detection topic segmentation section 104, and those by model based topic segmentation, carried out by the model base topic segmentation section 102, are not perfectly coincident with each other. That is, the two may, for example, be shifted each other by several words. Even in such case, the segmentation may be regarded to be correct.

In the parameter estimation section 103, the correct solution segmentation accuracy of the result of segmentation by the Hearst method in case the result of segmentation of model based topic segmentation has been taken to be a correct solution may be evaluated by Recall, Precision, F-value and so forth.

Recall stands for the proportion of the points, obtained on correct segmentation, to the points for segmentation.

Precision stands for the proportion of the points, obtained on correct segmentation, to the points obtained on segmentation.

The F-value is a harmonic mean of Recall and Precision.

If, in the results of change point detection topic segmentation of (d) of FIG. 6, the threshold value of the degree of similarity is th1, for example, six points (H1 to H3 and H5 to H7), from among six points for segmentation (M1 to M3 and M5 to M7), represent correct segmentation.

Hence, Recall is 6/6=1.0.

On the other hand, from among the 12 points obtained on segmentation (H1 to H12), six points (H1 to H3 and H5 to H7) represent correct segmentation.

Hence, Precision is 6/12=0.5, so that the F-value is 0.67.

Table of FIG. 7A shows a list of the results of the computation of the correct solution segmentation accuracy in case of using th1, th2 and th3 as the threshold values of the degree of similarity.

If the correct solution segmentation accuracy is evaluated by the F-value, it is when the threshold value of the degree of similarity th2 is used that the correct solution segmentation accuracy is maximum. Hence, the parameter estimation section 103 estimates the threshold value of the degree of similarity to be th2.

In estimating the parameters of the change point detection topic segmentation section 104, the parameter estimation section 103 may refer only to the results of intervals determined by the model base topic segmentation section 102 to be known topic intervals in order to compare the result of segmentation by the model base topic segmentation section 102 to the result of segmentation by the Hearst method in case of using a variety of parameters.

The interval of an unknown topic may not be segmented correctly by the model base topic segmentation section 102. Thus, by excluding the results of the interval of an unknown topic, it becomes possible to more properly estimate the parameters usable for segmentation into topic units as desired.

Let it be assumed that, in FIG. 6, only the results of the intervals M1 to M3 and M5 to M7, decided to be the intervals of known topics, are used, and the correct solution segmentation accuracy for each of the threshold values of the degree of similarity is computed. The results of the computations are as shown in FIG. 7B. In case the threshold value of the degree of similarity is th2, the F-value is 1.0, testifying to high segmentation confidence.

Here, the threshold value of the degree of similarity is taken as an example of a parameter estimated by the parameter estimation section 103. However, estimation may similarly be made for other parameters, such as window widths or the number of times of smoothing operations for the values of the degree of similarity.

In the present exemplary embodiment, the method for parameter estimation by the parameter estimation section 103 is not to be limited to parameter estimation for the case where the Hearst method is used in the change point detection topic segmentation section 104. Even in case the change point detection topic segmentation section 104 segments the input text using a technique other than the Hearst method, it is possible for the parameter estimation section 103 to estimate the parameter for the change point detection topic segmentation section 104 by a method similar to that described above. For example, the method for text segmentation as described in Non-Patent Document 3 may be used as another technique of segmenting the input text by detecting the change point of word distribution in the input text.

The method for text segmentation, described in Non-Patent Document 3, is a technique of segmenting an input text by learning HMM in which the input text is regarded to be learning data, with the states corresponding to the topics. As a parameter that causes the result of segmentation to be varied, there is a super-parameter of a priori distribution of HMM.

In the present exemplary embodiment, if the method of text segmentation as disclosed in Non-Patent Document 3 is used as the change point detection topic segmentation section 104, the parameter estimation section 103 is able to estimate the super-parameter of the a priori distribution of HMM by a method similar to that described above.

In the present exemplary embodiment, the change point detection topic segmentation section 104 segments the input text using the parameter estimated by the parameter estimation section 103. Hence, the change point detection topic segmentation section 104 is able to segment any interval in the input text into quasi-optimum topic units.

This point will be described again with reference to FIG. 5.

First, it is supposed that, in an example of FIG. 5, the threshold value for the degree of similarity th2, as estimated by the parameter estimation section 103, is used. The change point detection topic segmentation section 104 is then able to segment an interval of a known topic into topic units approximate to desired units in accordance with the Hearst method.

Referring to FIG. 5, in connection with the intervals of known topics (intervals A1 to A3 and intervals A5 to A7), the segmentation points H1 to H3 and H5 to H7 have been obtained by the change point detection topic segmentation section 104 in accordance with the Hearst method with the use of the threshold value for the degree of similarity th2. These segmentation points segment each interval of the known topics into individual news items which are the topic units as desired. Namely, it is possible to segment the news into individual news items of 'exchange', 'baseball', 'soccer' and 'general election'.

This may be a natural consequence of the fact that the threshold value for the degree of similarity th2 has been found so as to optimally reproduce the result of segmentation by the model base topic segmentation section 102 capable of optimally segmenting the interval of the known topics into topic units as desired.

Further, if the threshold value for the degree of similarity th2 is used in the change point detection topic segmentation section 104, the interval of an unknown topic in the input text may also be segmented into topic units as desired, that is, into individual news units. It is because the value of a parameter usable for segmenting a given text into topic units as desired may be expected to remain substantially constant throughout the text. In actuality, it may be seen from FIG. 5 that, if the threshold value for the degree of similarity th2 is used in the change point detection topic segmentation section 104, a point of segmentation H4 may be obtained by the Hearst method for the interval of an unknown topic (intervals A3 to A5) in the input text. Hence, the news for the interval of an unknown topic may be segmented into individual news items, that is, 'skating' and 'golf'.

It is seen from above that, if th2 is used as a threshold value for the degree of similarity by the change point detection topic segmentation section 104, the input text in its entirety may be substantially segmented into individual news items in accordance with the Hearst method. If th3 is used as a threshold value for the degree of similarity, the input text in its entirety may be substantially segmented into individual news genre units in accordance with the Hearst method. By the segmentation points H2 and H6, the input text may be segmented into economics, sports and politics.

Finally, the segmentation result integration section 105 integrates the result of segmentation by the model base topic segmentation section 102 and the result of segmentation by the change point detection topic segmentation section 104 to output the final result of segmentation of the input text. More specifically, the total of the intervals of the input text may be segmented into topic units as desired, if H4 which is the result of segmentation by the change point detection topic segmentation section 104 is output for the intervals M3-M5 which are decided to be the topic interval of an unknown topic; and M1 to M3 and M5 to M7, as the result of segmentation by the model base topic segmentation section 102, are output for the intervals M1-M3 and M5-M7 which are decided to be intervals of known topics.

Alternatively, H1 through to H7, as the result of segmentation by the change point detection topic segmentation section 104, may be output for the total of the intervals of the input text.

It is noted that the model base topic segmentation section 102 may output the segmentation confidence, indicating the degree of certainty of segmentation, to each interval of the input text. The interval with high segmentation confidence means that the possibility of the result of segmentation by the model base topic segmentation section 102 being correct is high. Conversely, the interval with low segmentation confidence means that the possibility of the result of segmentation by the model base topic segmentation section 102 being not correct is high.

In the present exemplary embodiment, a likelihood of the topic model best matched to a given interval of the input text may be taken to be the segmentation confidence of the interval in question. It is because the higher the likelihood of the topic model matched to a given interval of the input text, the higher in general is the possibility that the result of segmentation for the interval in question is correct. It is observed that, given a data X, the likelihood $L(\theta)$ of a parameter $\theta$ may be expressed by a conditional probability $P[X|\theta]$.

Alternatively, the a posteriori probability of each topic model may be computed for each interval of the input text, in which the smaller the entropy of the a posteriori probability is, the higher is to be the segmentation confidence. For example, a reciprocal of the entropy of the a posteriori probability may be taken to be the segmentation confidence. If the a posteriori probability of the topic model is Pi, the entropy H of the a posteriori probability is given by $-\Sigma iPi \cdot \log(Pi)$. When the entropy of the a posteriori probability is small, the a posteriori probability of a specified topic model is high. That is, a small value of the entropy of the a posteriori probability means that only the specified topic model has been matched satisfactorily to the input text, and hence the result of segmentation for the interval in question is high. The a posteriori probability of each topic model may be computed with ease using the likelihood of each topic model. As is well-known, given a data X, the a posteriori probability of a parameter $\theta i$ is given by $$P[\theta i|X] = P[X|\theta i] \cdot P[\theta i]/\{\Sigma iP[X|\theta i] \cdot P[\theta i]\}$$

where $P[\theta i]$ is a priori probability of each topic. This a priori probability may be found at the outset from the learning data or may be made constant irrespectively of the topic.

Alternatively, the segmentation confidence may be made lower for an interval of an unknown topic to which a garbage model, a topic model not representing any specified topic, has been matched to. It is because the interval, the garbage model has been matched to, indicates that the interval has not been matched to any topic model, and consequently, as a matter of course, has not been segmented correctly.

In case the model base topic segmentation section 102 outputs the segmentation confidence, the parameter estimation section 103 may refer only to the result of the interval whose segmentation confidence exceeds a preset value. The parameter estimation means 103 may then compare the result of segmentation by the model base topic segmentation means 102 and the result of segmentation by the Hearst method in which a variety of parameters are used. The parameter estimation means 103 may then estimate the parameter for the change point detection topic segmentation means 104.

In this manner, the results of the intervals where the probability of correct segmentation by the model base topic segmentation means 102 are high are used to estimate the parameter, whereby it becomes possible to more properly estimate the parameter usable for segmentation into topic units as desired.

In case the model base topic segmentation means 102 outputs the segmentation confidence, the segmentation result integration means 105 may output the result of segmentation by the change point detection topic segmentation means 104 for an interval whose segmentation confidence is not higher than a preset value; and the result of segmentation by the model base topic segmentation means 102 for an interval whose segmentation confidence is not lower than a preset value.

In this manner, the result of the change point detection topic segmentation means 104 is output for an interval where the possibility that the result of segmentation by the model base topic segmentation means 102 are in error is high, that is, an interval whose segmentation confidence is not higher than a preset value. By so doing, the entire input text may be segmented more correctly into topics as desired.

In the present exemplary embodiment, the parameter estimation means 103 estimates the parameter for the change point detection topic segmentation means 104, using the result of segmentation by the model base topic segmentation means 102 as teacher. However, the present invention is not to be restricted to this configuration. For example, the parameter estimation means 103 may estimate the parameter for the change point detection topic segmentation means 104 using the result of segmentation other than those by the model base topic segmentation means 102 as teacher.

The input text may, for example, be segmented by a manual operation into topic units as desired, instead of by the model base topic segmentation means 102. The parameter estimation means 103 may thus use the result of segmentation by the manual operation as teacher. By so doing, part of the input text may be segmented into topic units as desired, by a manual operation, and the remaining portions of the input text may be segmented into topic units as desired.

The operation and effect of the present invention will now be described.

In the present exemplary embodiment, in which the parameter estimation means 103 uses the result of segmentation by the model base topic segmentation means 102 as training data, such a parameter may be estimated that will allow the change point detection topic segmentation means 104 to segment any interval in the input text into topic units as desired. Hence, the text may be segmented into desired topic units irrespectively of the sort of the input text.

Figure 2:
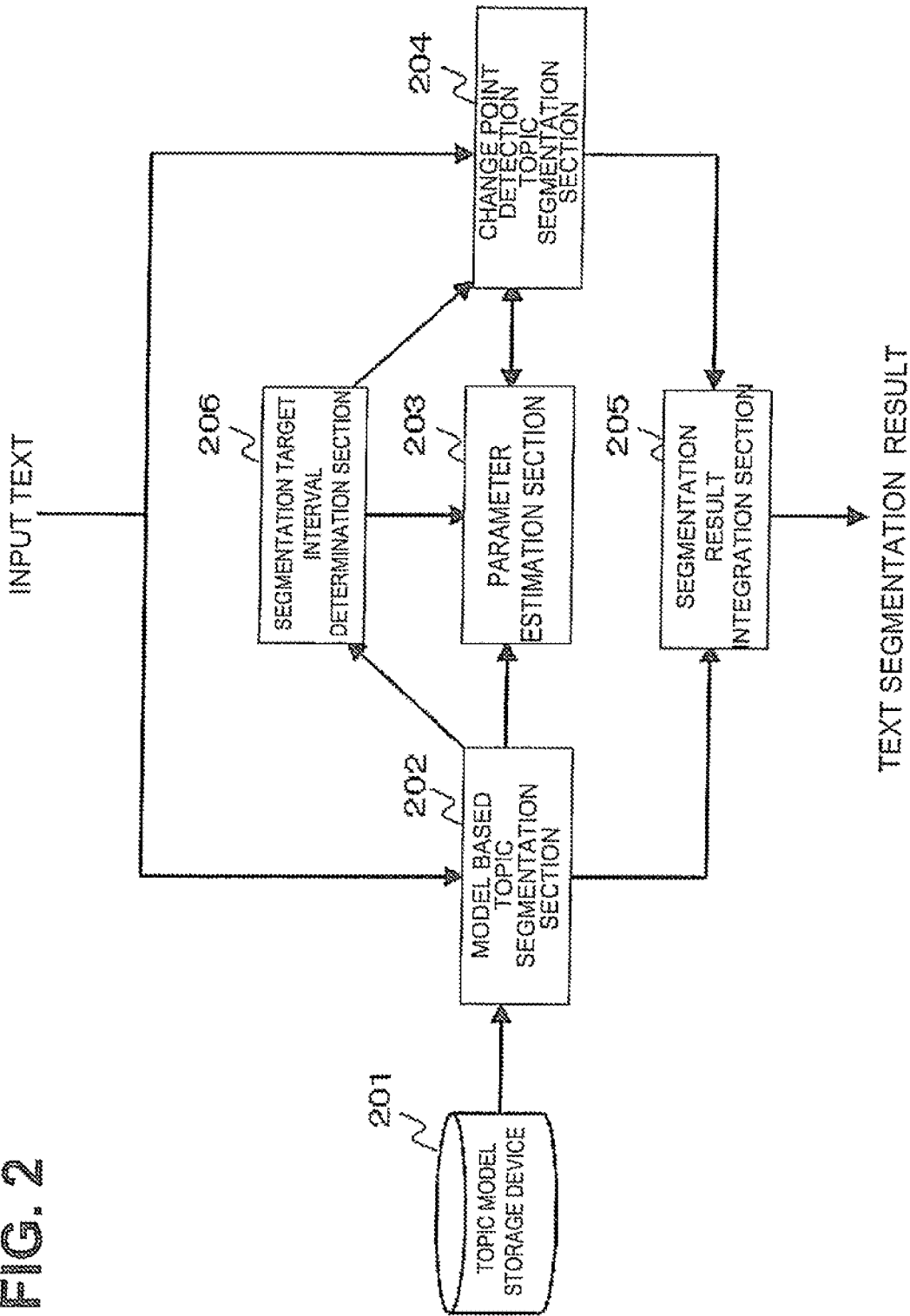
FIG. 2 is a diagram showing a configuration of a second exemplary embodiment of the present invention.

A second exemplary embodiment of the present invention will now be described with reference to the drawings. FIG. 2 shows a configuration of the second exemplary embodiment of the present invention. In the second exemplary embodiment, a means for determining an interval targeted for segmentation is added to the previous a first exemplary embodiment.

Figure 4:
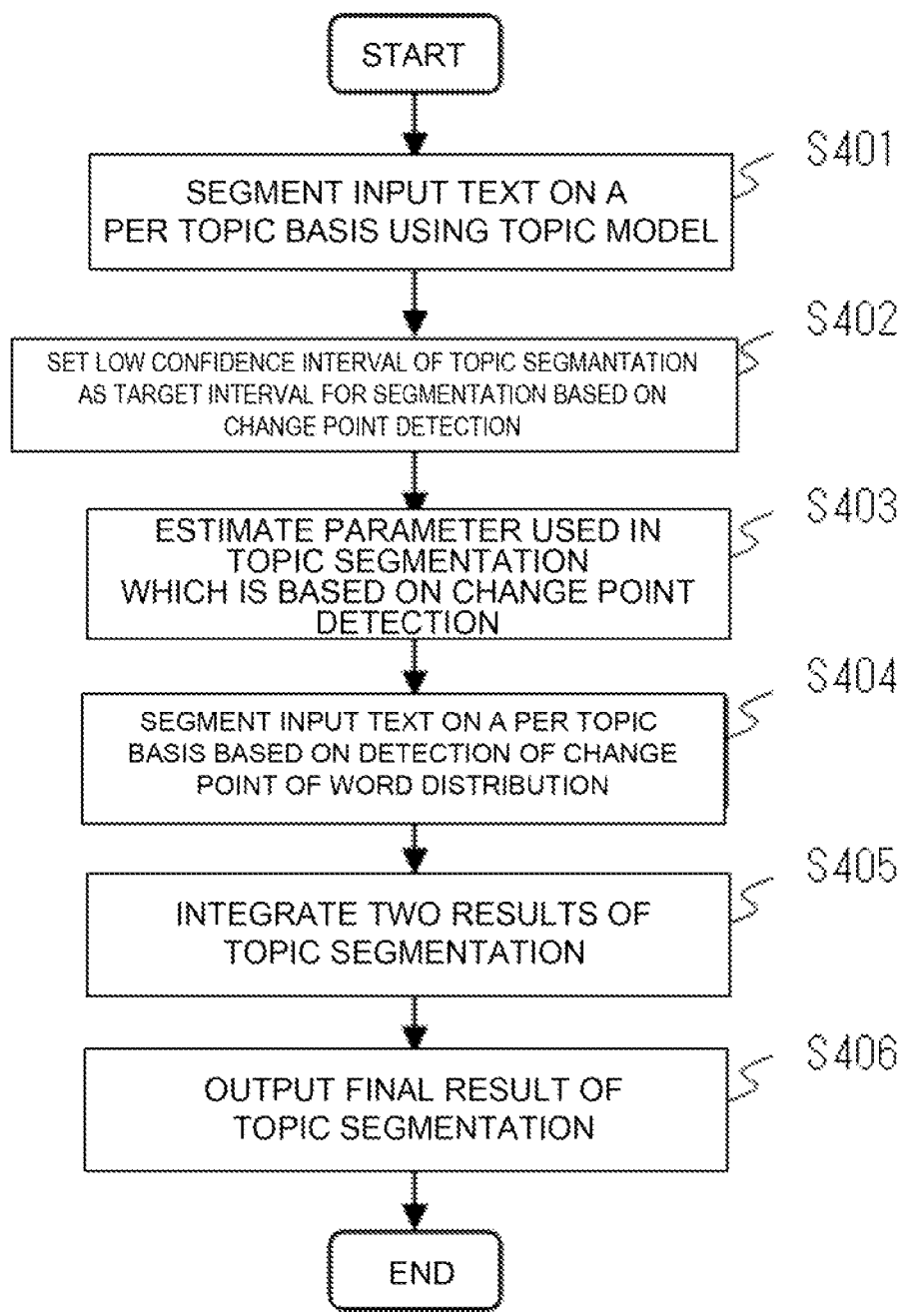
FIG. 4 is a flowchart for illustrating the operation of the second exemplary embodiment of the present invention.
Figure 8:
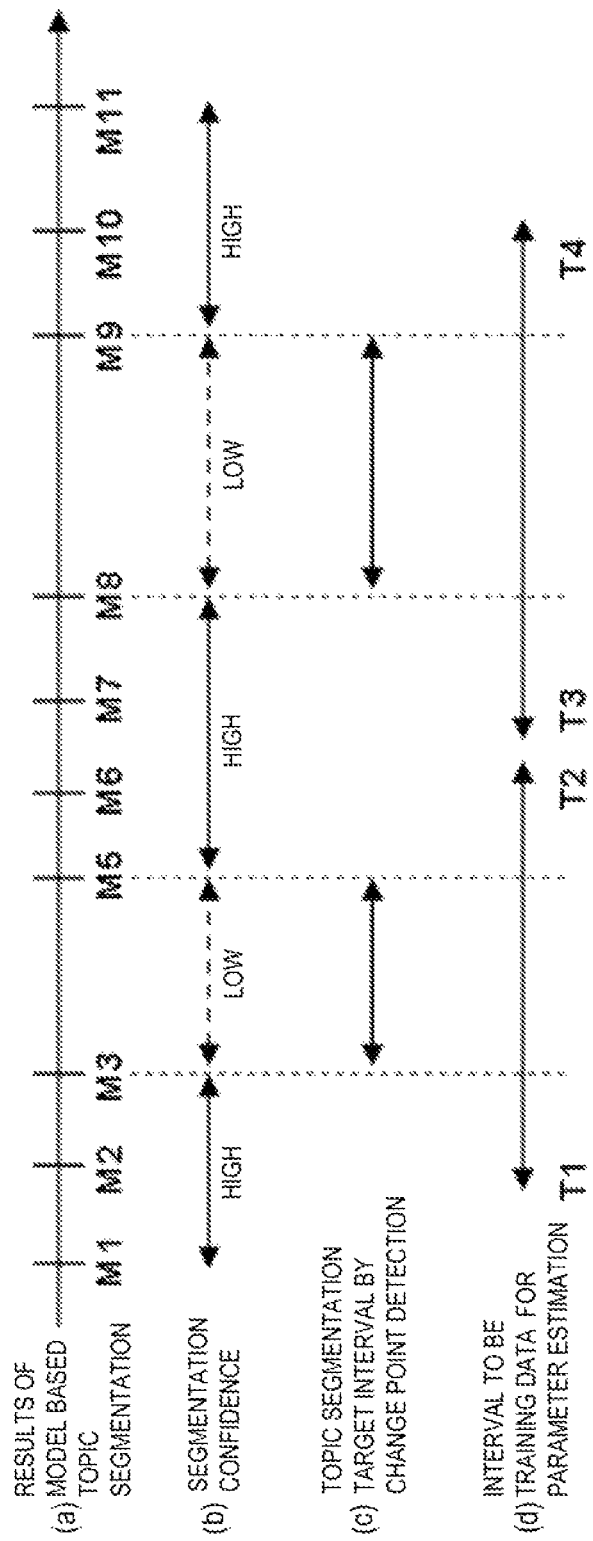
FIG. 8 is a schematic view showing an example operation of the second exemplary embodiment of the present invention.

Referring to FIG. 2, a second exemplary embodiment of the present invention is directed to an apparatus for segmenting an input text into a plurality of intervals. The present Example includes a topic model storage device 201, a model base topic segmentation means 202, a parameter estimation means 203, a change point detection topic segmentation means 204, a segmentation result integration means 205 and a segmentation target interval determination means 206. FIG. 4 shows a flowchart for illustrating the operation of a second exemplary embodiment of the present invention. FIG. 8 is a schematic diagram for illustrating a second exemplary embodiment of the present invention.

Referring to FIGS. 2, 4 and 8, the global operation of the present exemplary embodiment will be described in detail. The topic model storage device 201 and the model base topic segmentation means 202 respectively operate in similar manner to the topic model storage device 101 and the model base topic segmentation means 102 of a first exemplary embodiment of the present invention. Hence, those means are not here described in detail.

Initially, the model base topic segmentation means 202 segments an input text using topic models stored in the topic model storage device 201 (step S401 of FIG. 4). At this time, the model base topic segmentation section 202 outputs segmentation confidence, representing the degree of certainty of segmentation, to each interval of the input text.

The segmentation confidence may be computed based on the likelihood or on the entropy of the a posteriori probability of the topic model, or on whether or not each interval of the input text has matched to the garbage model, as described in connection with a first exemplary embodiment of the present invention.

In an example shown in FIG. 8, the input text is segmented by the model base topic segmentation section 202 at segmentation points M1, M2, M3, M5, M6, M7, M8, M9, M10 and M11. The interval M3-M5 and the interval M8-M9 are decided to be low in segmentation confidence.

The segmentation target interval determination section 206 then determines an interval or intervals, whose segmentation confidence is not higher than a preset value, as being a segmentation target interval or intervals for the change point detection topic segmentation section 204 (step S402 of FIG. 4).

It is highly probable that the result of segmentation by the model base topic segmentation section 202 for the interval or intervals with low segmentation confidence are in error. It may thus be presumed that more desirable results of segmentation may be obtained in case the above interval or intervals are segmented by the change point detection topic segmentation section 204.

In an example shown in FIG. 8, the interval M3-M5 and the interval M8-M9 are determined as being the intervals to be segmented by the change point detection topic segmentation section 204.

Similarly to the parameter estimation section 103 of the first exemplary embodiment of the present invention, the parameter estimation section 203 estimates a parameter for the change point detection topic segmentation section 204 (step S403 of FIG. 4). At this time, only the result of segmentation by the model base topic segmentation section 202 for the range of the segmentation target interval which has been determined by the segmentation target interval determination section 206 plus a preset range extended from the segmentation target interval are used as training data. It is in this respect that the parameter estimation section 203 differs from the parameter estimation section 103 of the first exemplary embodiment of the present invention.

In the example shown in FIG. 8, the parameter used by the change point detection topic segmentation section 204 in segmenting the interval M3-M5 is estimated using only the results of segmentation (M2, M3, M5 and M6) of model based topics for the interval T1-T2 which is a range of the segmentation target interval M3-M5 plus a preset range extended from the segmentation target interval.

The parameter used by the change point detection topic segmentation section 204 in segmenting the interval M8-M9 is estimated using only the results of segmentation of model based topics (M7, M8, M9 and M10) for the interval T3-T4 which is for a range of the segmentation target interval M8-M9 plus a preset range extended from the segmentation target interval as training data.

It may be conceived that the closer two optional positions in an input text to each other, the more alike are parameter values for the two positions used for segmenting the input text into desired topic units. Hence, by using only the results of segmentation of model based topics for a range of the segmentation target interval plus a preset range extended from the segmentation target interval, as training data, it becomes possible to estimate a parameter more proper for use in segmenting the segmentation target interval into desired topic units.

The simplest method of determining the above mentioned preset range, namely, the range of the results of segmentation of the model based topics, used as training data, is to use an interval obtained on expanding the segmentation target interval by a preset value in each of the forward and rear directions.

Even with this simple method, only the results of segmentation of the model based topics of the segmentation target interval and a range on each side of the segmentation target interval are used as training data. Hence, a parameter more proper than that obtained with the use of the entire input text may be obtained as training data in segmenting the segmentation target interval into desired topic units.

Alternatively, in another method, the range used as training data may be expanded little by little, as the parameter is being estimated. An abrupt change in the parameter value being estimated is detected, and the range that prevailed immediately before the change occurred may be used as the preset range. That is, when the estimated parameter values are changed abruptly, it may be conceived that the property of the input text has changed drastically before and after the range. Thus, by determining the preset range in this manner, it becomes possible to estimate the proper parameter value.

The change point detection topic segmentation section 204 segments the segmentation target interval, as determined by the segmentation target interval determination section 206 in the input text, using the parameter estimated by the parameter estimation section 203 (step S404 of FIG. 4).

In the example shown in FIG. 8, the change point detection topic segmentation section 204 segments the segmentation target intervals M3-M5 and M8-M9. At this time, in segmenting the segmentation target interval M3-M5, a parameter value estimated using the result of segmentation of model based topics for the interval T1-T2 as training data is used; and in segmenting the segmentation target interval M8-M9, a parameter value estimated using the result of segmentation of model based topics for the interval T3-T4 as training data is used.

In the present exemplary embodiment, in which parameter values, properly estimated from one segmentation target interval to another by the parameter estimation section 203, are used, the input text may be segmented into topic units more approximate to desired topic units.

The segmentation result integration section 205 integrates the result of segmentation by the model base topic segmentation section 202 and the result of segmentation by the change point detection topic segmentation section 204 (step S405 of FIG. 4). The segmentation result integration section outputs the result of segmentation by the model base topic segmentation section 202 and by the change point detection topic segmentation section 204 as the final result of segmentation of the input text (step S406 of FIG. 4). Specifically, the segmentation result integration section 205 outputs the result of segmentation by the change point detection topic segmentation section 204 for the interval or intervals that are the target of segmentation by the change point detection topic segmentation section 204, and outputs the result of segmentation by the model base topic segmentation section 202 for the interval or intervals that are not the target of segmentation by the change point detection topic segmentation section 204.

The operation and the effect of the present exemplary embodiment will now be described.

In the present exemplary embodiment, the parameter of the change point detection topic segmentation section 204 is estimated using only the result of model based topic segmentation for a range of the segmentation target interval plus a preset range extended from the segmentation target interval. Hence, it becomes possible to estimate the parameter value in agreement with the property of the text portion around the segmentation target interval. As a result, it becomes possible to improve the accuracy with which the segmentation target interval may be segmented into topic units as desired.

Further, according to the present exemplary embodiment, the result of model based topic segmentation within the range of the segmentation target interval plus the preset range extended from the segmentation target interval are used as training data from one segmentation target interval by the change point detection topic segmentation section 204 to another. Thus, even in case the optimum parameter value for obtaining the topic units as desired is varied in the input text, the input text may highly accurately be segmented by the change point detection topic segmentation section 204 into desired topic units.

A third exemplary embodiment of the present invention will now be described in detail with reference to the drawings.

The present exemplary embodiment may be implemented as a computer operating in accordance with a program that implements the first and second exemplary embodiments.

Figure 9:
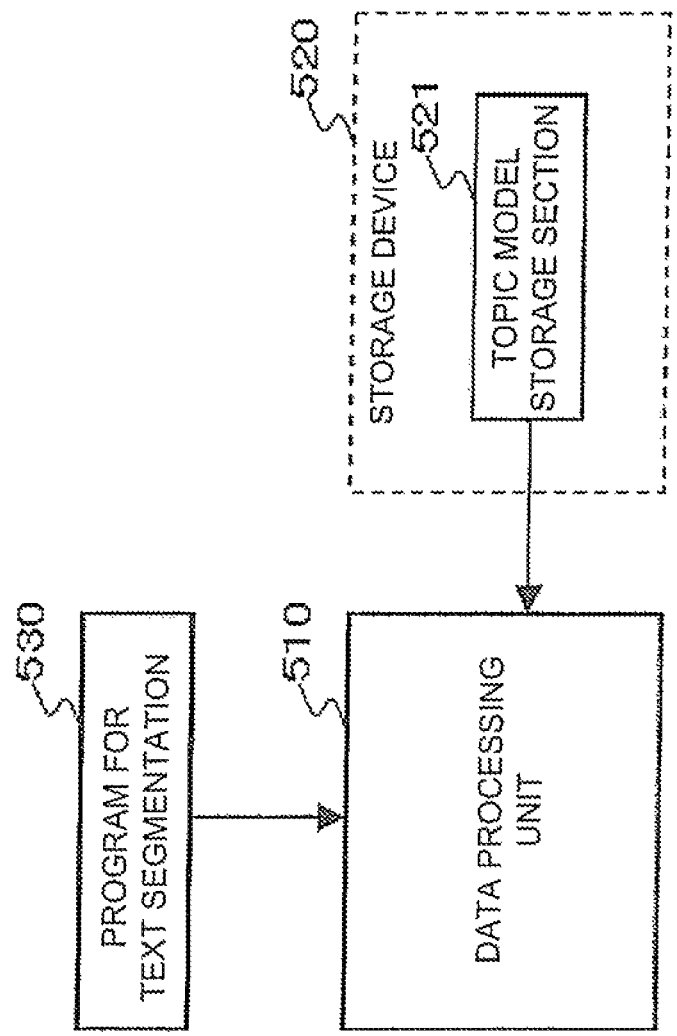
FIG. 9 is a diagram showing a configuration of a third exemplary embodiment of the present invention.
Figure 10:
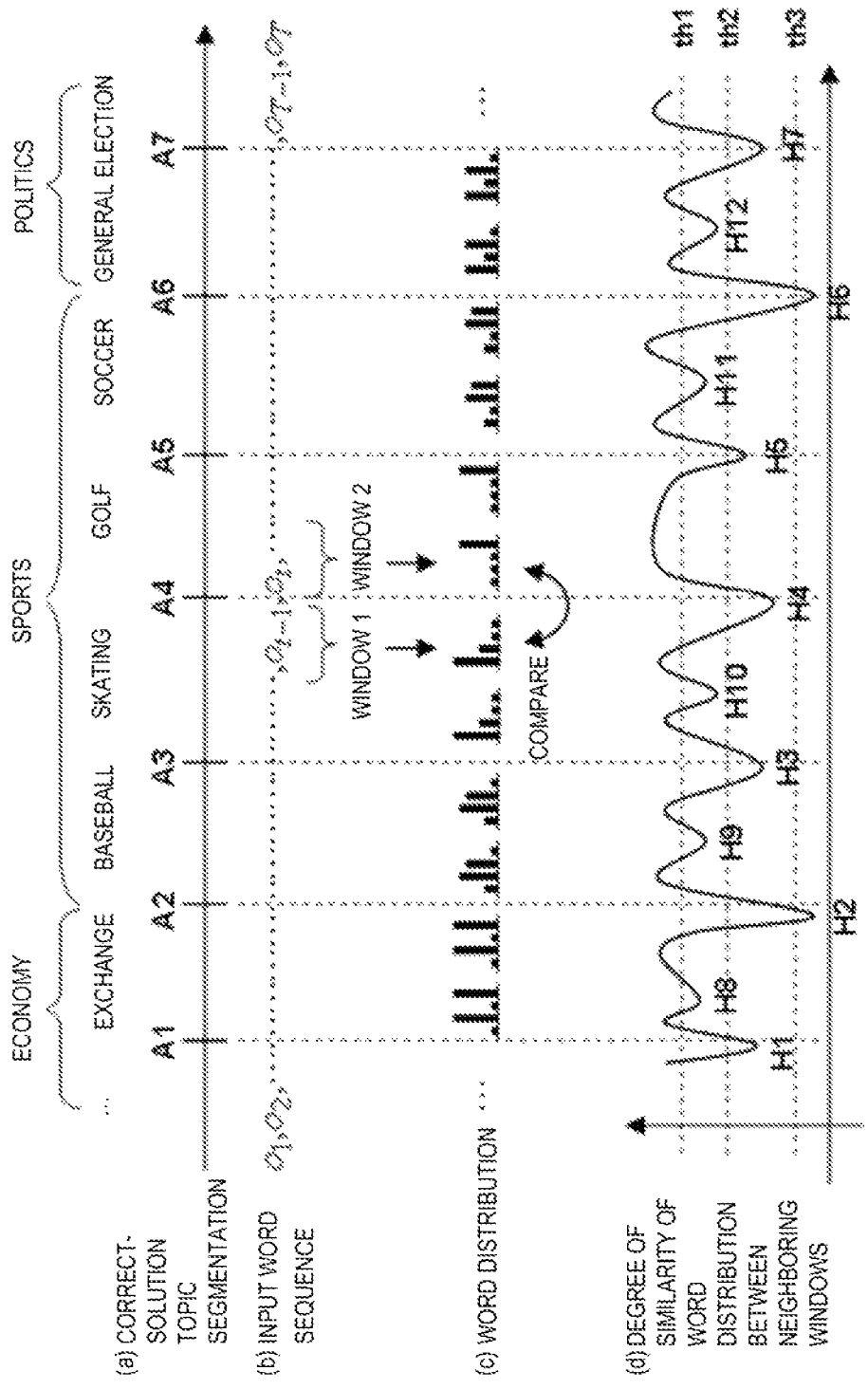
FIG. 10 is a schematic view showing an example operation of a first related art.
Figure 11:
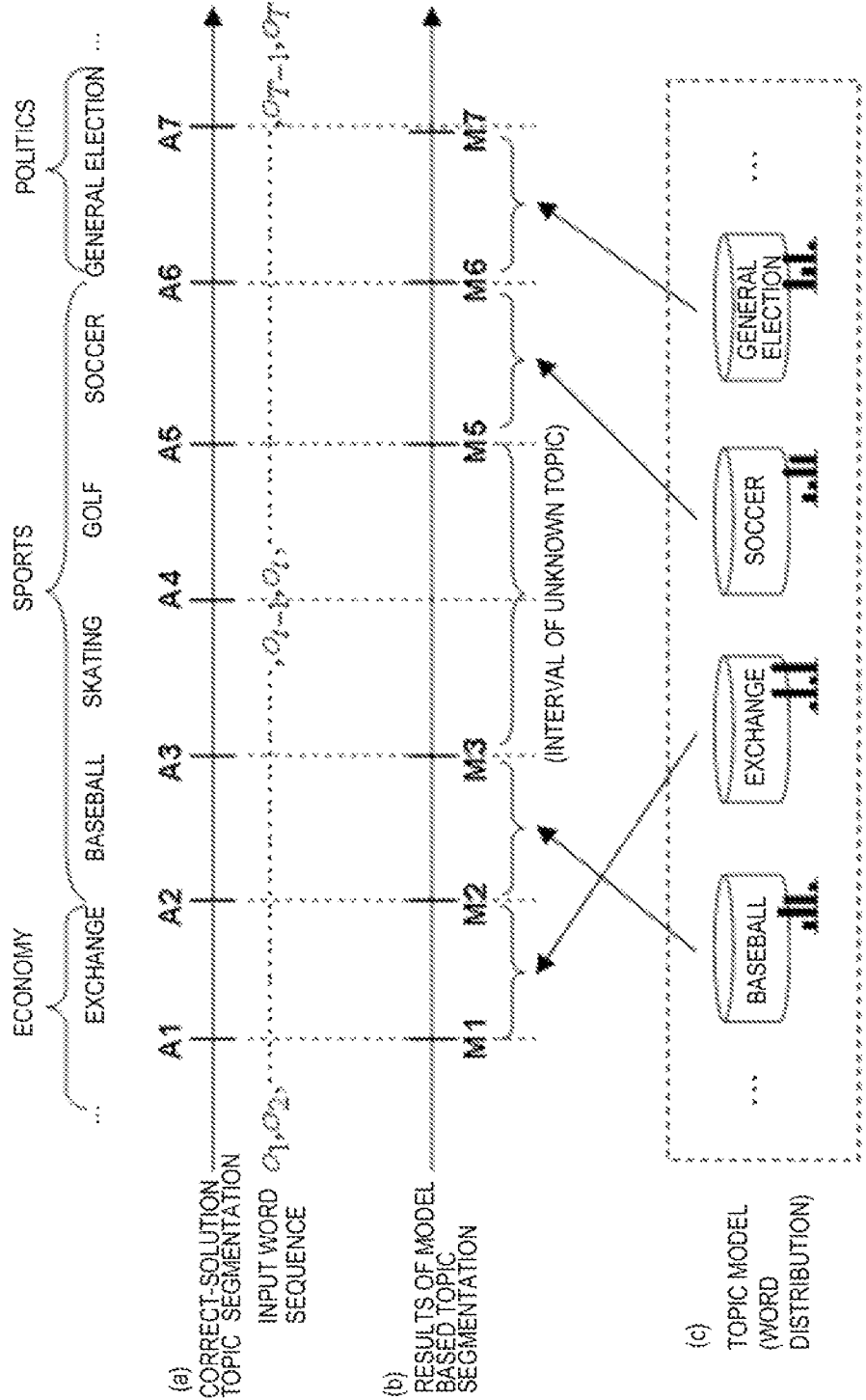
FIG. 11 is a schematic view showing an operation of a second related art.
Figure 12:
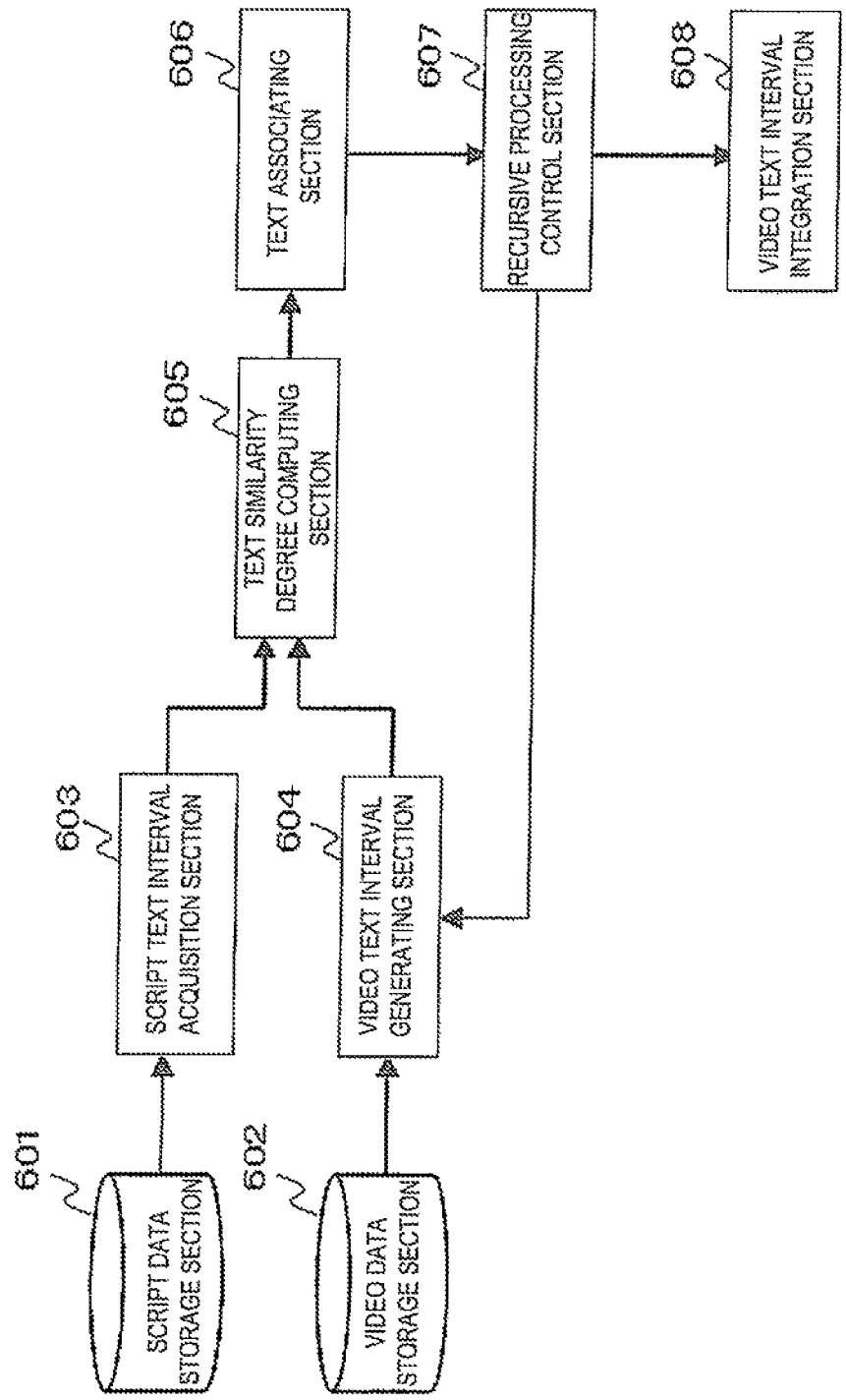
FIG. 12 is a diagram showing a configuration of a third related art.

Referring to FIG. 9, in the present exemplary embodiment, there are provided a data processing unit 510, constituted by an MPU, for example, a storage device 520, constituted by a magnetic disc or a semiconductor memory, and a program for text segmentation 530. The storage device 520 is used as a topic model storage device 521. The program for text segmentation 530 is read by the data processing unit 510 to control the operation of the data processing unit 510 to allow for realization of the operation of the first and second exemplary embodiments on the data processing unit 510. That is, the data processing unit 510 executes the processing by the model base topic segmentation section 102, topic model storage device 101, parameter estimation section 103, change point detection topic segmentation section 104 and the segmentation result integration section 105 of FIG. 1 or the processing by the model base topic segmentation section 202, parameter estimation section 203, change point detection topic segmentation section 204, segmentation result integration section 205 and the segmentation target interval determination section 206, under control by the program for text segmentation 530. In the present exemplary embodiment, there is also provided a computer-readable storage medium storing the program for text segmentation 530.

INDUSTRIAL UTILIZABILITY

The present invention may find its application for such uses as an information browsing system, and as a program for implementing the information browsing system on a computer. The information browsing system allows for browsing of the media data, such as text, speech or video in a state these are arranged in order on the on a per topic basis. The present invention may find its application for an information retrieval system for retrieving media data concerning specified topics from among the voluminous media data.

The articular exemplary embodiments or examples may be modified or adjusted within the gamut of the entire disclosure of the present invention, inclusive of claims, based on the fundamental technical concept of the invention. Further, a large variety of combinations or selection of elements disclosed herein may be made within the framework of the claims. That is, the present invention may encompass various modifications or corrections that may occur to those skilled in the art in accordance with and within the gamut of the entire disclosure of the present invention, inclusive of claim and the technical concept of the present invention.

What is claimed is:

1. An apparatus for segmenting a text into a plurality of intervals, comprising:
   a topic model storage device that stores a topic model representing a semantic coherence;
   a model base topic segmentation section that segments the text in association with a topic, using the topic model stored in the topic model storage device;
   a parameter estimation section that estimates a parameter using a result of segmentation of the text by the model base topic segmentation section as training data, the parameter being used in segmenting the text based on detection of a change point in word distribution in the text; and
   a change point detection topic segmentation section that segments the text, based on detection of a change point of word distribution in the text, using the parameter estimated by the parameter estimation section.

2. The text segmentation apparatus according to claim 1, wherein the model base topic segmentation section outputs a segmentation confidence representing the degree of certainty of the segmentation of the text to at least one interval obtained on segmentation of the text in association with a topic,
   the parameter estimation section estimating the parameter used by the change point detection topic segmentation section, in an interval of a higher segmentation confidence, using the result of segmentation by the model base topic segmentation section as training data.

3. The text segmentation apparatus according to claim 2, wherein the parameter estimation section estimates a parameter used by the change point detection topic segmentation section to segment a segmentation target interval of the text, using the result of segmentation by the model base topic segmentation section for a range of the segmentation target interval plus a preset range extended from the segmentation target interval of the text as training data.

4. The text segmentation apparatus according to claim 2, further comprising:
   a segmentation result integration section that outputs the result of segmentation by the model base topic segmentation section in an interval of a higher segmentation confidence from among a plurality of intervals obtained on segmentation of the text and that outputs the result of segmentation by the change point detection topic segmentation section in an interval of a lower segmentation confidence.

5. The text segmentation apparatus according to claim 2, wherein the model base topic segmentation section outputs the segmentation confidence of a higher value for an interval in the text regarding a topic represented by any of the topic models stored in the topic model storage device, and outputs the segmentation confidence of a lower value for an interval in the text regarding a topic not corresponding to any topic represented by the topic model stored in the topic model storage device.

6. The text segmentation apparatus according to claim 5, wherein the model base topic segmentation section decides an interval, matched to a garbage model not representing a specified topic, to be an interval regarding a topic not corresponding to any topic represented by a topic model stored in the topic model storage device, and outputs the segmentation confidence of a lower value for the interval.

7. The text segmentation apparatus according to claim 2, wherein the model base topic segmentation section computes the segmentation confidence for at least one interval obtained on segmenting the text in association with the topic by a likelihood of the topic model or an entropy of an a posteriori probability of the topic model.

8. The text segmentation apparatus according to claim 3, wherein, in case the segmentation target interval includes a plurality of intervals, the parameter estimation section estimates a parameter used by the change point detection topic segmentation section in segmenting the segmentation target interval into the intervals, using the result of segmentation by the model base topic segmentation section for a range of the segmentation target interval plus a preset range extended from the segmentation target interval as training data,
   the change point detection topic segmentation section segmenting the segmentation target interval into the intervals, using a parameter estimated for the segmentation target interval by the parameter estimation section.

9. The text segmentation apparatus according to claim 3, further comprising:
   a segmentation target interval determination section that determines an interval of a lower segmentation confidence to be a segmentation target interval of the text to be segmented by the change point detection topic segmentation section,
   the change point detection topic segmentation section segmenting the segmentation target interval determined by the segmentation target interval determination section.

10. A method for segmenting a text into a plurality of intervals, the method comprising:
    a model based topic segmentation step of referencing, by a processor, a topic model storage device that stores a topic model representing semantic cohesion and segmenting, by the processor, the text in association with a topic using the topic model;
    a parameter estimation step of estimating, by the processor, a parameter using a result of segmentation of the text by the model based topic segmentation step as training data, the parameter being used in segmenting the text based on detection of a change point in word distribution in the text; and
    a change point detection topic segmentation step of segmenting the text, based on detection, by the processor, of a change point of word distribution in the text, using the parameter estimated by the parameter estimating step.

11. The method according to claim 10, wherein the model based topic segmentation step outputs a segmentation confidence, representing the degree of certainty of segmentation of the text, to at least one interval obtained on segmentation of the text in association with the topic, the parameter estimation step, in the interval of a higher value of the segmentation confidence, estimating the parameter used in the change point detection topic segmentation step, using the result of segmentation by the model based topic segmentation step as training data.

12. The method according to claim 11, wherein the parameter estimation step estimates a parameter used by the change point detection topic segmentation step in segmenting the segmentation target interval, using the result of segmentation by the model based topic segmentation step for a range of the segmentation target interval plus a preset range extended from the segmentation target interval of the text as training data.

13. The method according to claim 11, further comprising:
a segmentation result integration step of outputting, in an interval of a higher value of the segmentation confidence, from among a plurality of intervals resulting from segmentation of the text, the result of segmentation by the model based topic segmentation step, and
outputting, in an interval of a lower value of the segmentation confidence, the result of segmentation by the change point detection topic segmentation step.

14. The method according to claim 11, wherein the model based topic segmentation step outputs the segmentation confidence of a higher value to an interval in the text relevant to a topic represented by any one of topic models stored in the topic model storing step, and outputs the segmentation confidence of a lower value to an interval in the text relevant to a topic associated with none of topics represented by topic models stored in the topic model storing step.

15. The method according to claim 14, wherein the model based topic segmentation step decides that an interval matched to a garbage model representing none of specified topics in the text is an interval relevant to a topic associated with none of topics represented by topic models stored in the topic model storing step, and outputs the segmentation confidence at a lower value for the interval.

16. The method according to claim 11, wherein the model based topic segmentation step computes the segmentation confidence by a likelihood of the topic model or by an entropy of an a posteriori probability of the topic model for at least one interval obtained on segmentation of the text in association with the topic.

17. The method according to claim 12, wherein the segmentation target interval includes a plurality of intervals,
the parameter estimation step estimating a parameter used by the change point detection topic segmentation step in segmenting the segmentation target interval into the intervals, using the result of segmentation by the model based topic segmentation step for a range of the segmentation target interval plus a preset range extended from the segmentation target interval as training data, and
the change point detection topic segmentation step segmenting the segmentation target interval into the intervals, using a parameter estimated for the segmentation target interval by the parameter estimation step.

18. The method according to claim 12, further comprising:
a segmentation target interval determination step of determining the interval of lower segmentation confidence as being the segmentation target interval of the text by the change point detection topic segmentation step,
the change point detection topic segmentation step segmenting the segmentation target interval determined by the segmentation target interval determination step.

19. A computer-readable recording medium storing a program causing a computer that performs segmentation of a text into a plurality of intervals, to execute:
a model based topic segmentation processing that references a topic model storage device that stores a topic model representing semantic coherence, segments the text in association with the topic, with the aid of the topic model;
a parameter estimation processing that estimates a parameter, using a result of segmentation of the text by the model based topic segmentation processing as training data, the parameter being used in segmenting the text based on detection of a change point in word distribution in the text; and
a change point detection topic segmentation processing that segments the text based on detection of a change point of word distribution in the text, using the parameter estimated in the parameter estimation processing.

20. The computer-readable recording medium storing the program according to claim 19, wherein the model based topic segmentation processing outputs a segmentation confidence, representing the degree of certainty of segmentation of the text, to at least one interval obtained on segmenting the text in association with a topic,
the parameter estimation processing estimating the parameter used in the change point detection topic segmentation processing, in an interval of a higher value of the segmentation confidence, using the result of segmentation by the model based topic segmentation processing as training data.

21. The computer-readable recording medium storing the program according to claim 20, wherein the parameter estimation processing estimates a parameter used by the change point detection topic segmentation processing to segment the segmentation target interval, using the result of segmentation by the model based topic segmentation processing for a range of the segmentation target interval plus a preset range extended from the segmentation target interval of the text by the change point detection topic segmentation processing as training data.

22. The computer-readable recording medium storing the program according to claim 20, wherein the program causes the computer to further execute a segmentation result integration processing that outputs the result of segmentation by the model based topic segmentation processing for an interval of higher segmentation confidence, from among a plurality of intervals, resulting from segmentation of the text, and that outputs the result of segmentation by the change point detection topic segmentation processing for an interval of lower segmentation confidence.

23. The computer-readable recording medium storing the program according to claim 20, wherein the model based topic segmentation processing outputs the segmentation confidence of a higher value for an interval in the text regarding a topic represented by any one of topic models stored in the topic model storage device, and outputs the segmentation confidence of a lower value for an interval in the text regarding a topic associated with an none of topics represented by topic models stored in the topic model storage device.

24. The computer-readable recording medium storing the program according to claim 23, wherein the model based topic segmentation processing decides that an interval matched to a garbage model not representing a specified topic or topics in the text is an interval relevant to a topic associated with none of topics represented by topic models stored in the topic model storing processing, and outputs the segmentation confidence at a lower value for the interval.

25. The computer-readable recording medium storing the program according to claim 21, wherein the model based topic segmentation processing computes the segmentation confidence by a likelihood of the topic model or by an entropy of an a posteriori probability of the topic model for at least one interval obtained on segmentation of the text in association with a topic.

26. The computer-readable recording medium storing the program according to claim 21, wherein the segmentation target interval includes a plurality of intervals,
the parameter estimation processing estimating a parameter used by the change point detection topic segmentation processing in segmenting the segmentation target interval into the intervals, using the result of segmentation by the model based topic segmentation processing for a range of the segmentation target interval plus a preset range extended from the segmentation target interval as training data, and
the change point detection topic segmentation processing segmenting the segmentation target interval into the intervals, using a parameter estimated for the segmentation target interval by the parameter estimation processing.

27. The computer-readable recording medium storing the program according to claim 21, wherein the program causes the computer to further execute:
a segmentation target interval determination processing that determines the interval of lower segmentation confidence as being the segmentation target interval of the text by the change point detection topic segmentation processing,
the change point detection topic segmentation processing segmenting the segmentation target interval determined by the segmentation target interval determination processing.

28. A text segmentation system comprising:
a topic model storage device that stores a topic model representing a semantic coherence;
a model base topic segmentation section that inputs a text and segments the text in association with a topic of the topic model;
a change point detection topic segmentation section that inputs the text, detects a change point of word distribution in the text, with the aid of a preset parameter, and segments the text based on the result of change point detection;
a parameter estimation section that estimates a preset parameter used in the change point detection topic segmentation section so that an interval segmented from the text by the change point detection topic segmentation section will be more coincident with an interval segmented by the model base topic segmentation section, using the result of segmentation of the text by the model base topic segmentation section; and
a segmentation result integration section that outputs the result of segmentation by the model base topic segmentation section and the result of segmentation by the change point detection topic segmentation section.

29. The text segmentation system according to claim 28, wherein the model based topic segmentation section outputs a segmentation confidence of a higher value for an interval in the text regarding a topic represented by any one of topic models stored in the topic model storage device, and outputs the segmentation confidence of a lower value for an interval in the text regarding a topic associated with none of topics represented by topic models stored in the topic model storage device, wherein
the text segmentation system further comprises:
a segmentation target interval determination section that determines an interval of a lower value of the segmentation confidence to be a segmentation target interval by the change point detection topic segmentation section,
the change point detection topic segmentation section segmenting the segmentation target interval determined by the segmentation target interval determination section.

30. A text segmentation apparatus comprising:
a model based topic segmentation section that segments an input text into a plurality of intervals, in association with a topic, using a topic model;
a parameter estimation section that estimates a parameter in segmenting the text, based on detection of a change point of word distribution in the text, using the result of segmentation of the text by the model based topic segmentation section; and
a change point detection topic segmentation section that segments the text, based on detection of a change point of word distribution in the text, using the parameter estimated by the parameter estimation section; and
a segmentation result integration section that integrates the result of segmentation of the text by the model based topic segmentation section and the result of segmentation of the text by the change point detection topic segmentation section.

31. A method for segmenting a text comprising:
segmenting, by a processor, a text received into a plurality of intervals, in association with a topic, using a topic model;
estimating, by the processor, a parameter used in segmenting the text, based on detection of a change point of word distribution in the text, using the result of segmentation of the text as training data;
segmenting, by the processor, the text, based on detection of a change point of word distribution in the text, using the estimated parameter; and
integrating the result of segmentation of the text by the topic model and the result of segmentation of the text based on the change point detection.

32. A computer-readable recording medium storing a program that causes a computer to execute the processing comprising:
segmenting a text received into a plurality of intervals, in association with a topic, using a topic model;
estimating a parameter used in segmenting the text, based on detection of a change point of word distribution in the text, using the result of segmentation of the text as training data;
segmenting the text based on detection of a change point of word distribution in the text, using the parameter estimated; and
outputting the result of segmentation of the text by a topic model and the result of segmentation of the text that are based on the results of detection of the change point.

* * * * *